United States Patent
Baba et al.

(10) Patent No.: US 11,073,621 B2
(45) Date of Patent: Jul. 27, 2021

(54) ELECTRONIC TIMEPIECE

(71) Applicant: Seiko Epson Corporation, Tokyo (JP)

(72) Inventors: Norimitsu Baba, Shiojiri (JP); Keiichi Mukaiyama, Matsumoto (JP)

(73) Assignee: Seiko Epson Corporation

( * ) Notice: Subject to any disclaimer, the term of this patent is extended or adjusted under 35 U.S.C. 154(b) by 485 days.

(21) Appl. No.: 16/141,001

(22) Filed: Sep. 25, 2018

(65) Prior Publication Data

US 2019/0094384 A1    Mar. 28, 2019

(30) Foreign Application Priority Data

Sep. 26, 2017  (JP) .............................. JP2017-185479
Jun. 29, 2018  (JP) .............................. JP2018-124106

(51) Int. Cl.
*G04G 17/06*    (2006.01)
*G01S 19/35*    (2010.01)
(Continued)

(52) U.S. Cl.
CPC .............. *G01S 19/35* (2013.01); *G01S 19/14* (2013.01); *G04C 10/02* (2013.01); *G04R 20/04* (2013.01);
(Continued)

(58) Field of Classification Search
CPC ........ G04G 17/06; G04G 21/04; G04G 19/04; G01S 19/35; G01S 19/14; G04R 60/10; G04R 20/04; G04C 10/02; G04B 19/06
See application file for complete search history.

(56) References Cited

U.S. PATENT DOCUMENTS 8,467,272 B2 * 6/2013 Fujisawa ................ G04C 10/02
368/47
8,953,999 B2 * 2/2015 Akiyama ................ G01S 19/14
455/3.02
(Continued)

FOREIGN PATENT DOCUMENTS

JP     2010-096707 A     4/2010
JP     2012-211895 A     11/2012
(Continued)

OTHER PUBLICATIONS

Extended European Search Report for Application No. EP 18 19 5942 dated Mar. 26, 2019 (5 pages).

*Primary Examiner* — Sean Kayes
(74) *Attorney, Agent, or Firm* — Harness, Dickey & Pierce, P.L.C.

(57) ABSTRACT

An electronic timepiece includes a dial, a solar battery on a rear surface side of the dial, and an antenna on a rear surface side of the solar battery so as to receive a radio wave. The solar battery includes a solar cell for generating power and a first non-power generating section which transmits the radio wave to the antenna. The solar cell includes a metal electrode, a semiconductor layer on the dial side of the metal electrode, and a transparent electrode on the dial side of the semiconductor layer. The metal electrode and the transparent electrode are excluded from the first non-power generating section, and the semiconductor layer is included within at least a portion of the first non-power generating section. The solar battery further includes a non-conductive member which regulates light transmittance on the dial side of the semiconductor layer in the first non-power generating section.

20 Claims, 23 Drawing Sheets

(51) Int. Cl.
- *G04R 60/10* (2013.01)
- *G04C 10/02* (2006.01)
- *G01S 19/14* (2010.01)
- *G04R 20/04* (2013.01)
- G04G 21/04 (2013.01)
- G04G 19/02 (2006.01)
- G04B 19/06 (2006.01)

(52) U.S. Cl.
CPC .............. *G04R 60/10* (2013.01); *G04B 19/06* (2013.01); *G04G 19/02* (2013.01); *G04G 21/04* (2013.01)

(56) References Cited

U.S. PATENT DOCUMENTS

| | | | |
|---|---|---|---|
| 9,823,625 B2 * | 11/2017 | Abe | G04R 20/04 |
| 9,851,697 B2 * | 12/2017 | Saito | G04R 60/00 |
| 9,891,597 B2 * | 2/2018 | Abe | G04G 19/00 |
| 2010/0097896 A1 | 4/2010 | Baba | |
| 2015/0268639 A1 | 9/2015 | Abe et al. | |
| 2015/0277389 A1 | 10/2015 | Saito et al. | |
| 2016/0179061 A1 | 6/2016 | Abe et al. | |
| 2017/0038743 A1 * | 2/2017 | Sawada | G04C 10/02 |

FOREIGN PATENT DOCUMENTS

| | | |
|---|---|---|
| JP | 2013-040794 A | 2/2013 |
| JP | 2015-175805 A | 10/2015 |

\* cited by examiner

ELECTRONIC TIMEPIECE

BACKGROUND

1. Technical Field

The present invention relates to an electronic timepiece including a solar battery.

2. Related Art

In the related art, an electronic timepiece is known in which a solar battery formed by stacking a semiconductor layer and an electrode on each other is disposed on a rear surface side of an optically transparent dial, and in which an antenna for receiving a satellite signal is disposed on a case back side of the solar battery (for example, refer to JP-A-2012-211895 and JP-A-2010-96707).

According to the electronic timepiece disclosed in JP-A-2012-211895, to prevent the electrode of the solar battery from blocking a radio wave received by the antenna, the solar battery is disposed at a position where the solar battery does not overlap the antenna in a plan view (i.e., when viewed from the dial side). In the solar battery, the semiconductor layer has a dark purple color. When the dial is viewed from a front surface side, the color of the solar battery can be seen through the dial. Therefore, according to the electronic timepiece disclosed in JP-A-2012-211895, when the dial is viewed from the front surface side, a region having the solar battery and a region without the solar battery can both be observed and the mutual colors that are different from each other might be noticed. In order to eliminate the apparent difference in colors, a light shielding sheet having a colored portion at a position not overlapping the solar battery in the plan view is disposed on a rear surface side of the dial.

According to the electronic timepiece disclosed in JP-A-2010-96707, the solar battery includes a metal electrode, the semiconductor layer, and a transparent electrode which are stacked on one another sequentially in a direction from the case back toward the dial. According to the electronic timepiece in a second embodiment, in the plan view when viewed from the dial side, the solar battery is also disposed at the position where the solar battery overlaps the antenna. According to this configuration of the electronic timepiece, to prevent the electrode of the solar battery from blocking the radio wave received by the antenna, the metal electrode and the transparent electrode are not disposed at the position where the solar battery overlaps the antenna in the plan view. To make all of the colors appear identical when viewed through the dial from the front surface side, the semiconductor layer is disposed at the position where the solar battery overlaps the antenna.

However, according to the electronic timepiece disclosed in JP-A-2012-211895, the solar battery and the colored portion of the light shielding sheet are formed of mutually different materials, or respective distances of the solar battery and the light shielding sheet from the dial are different from each other. Accordingly, when the dial is viewed from the front surface side, there is a problem that the colors or textures appear different in the region having the solar battery and in the region without the solar battery. Since it therefore becomes necessary to provide the light shielding sheet which is a separate member other than the solar battery, the structure of the electronic timepiece is complicated (particularly in order to fix the light shielding sheet thereto), or the electronic timepiece is thickened, thereby causing a problem in that cost inevitably increases.

According to the electronic timepiece disclosed in JP-A-2010-96707, the semiconductor layer is disposed at the position where the solar battery overlaps the antenna. Accordingly, when the dial is viewed from the front surface side, the apparent difference in colors can be minimized between a region without an antenna and a region having the antenna.

However, the transparent electrode is not disposed at the position where the solar battery overlaps the antenna. Accordingly, light incident on the semiconductor layer from the dial side and light reflected on the dial side by the semiconductor layer are not absorbed by the transparent electrode.

Therefore, the position where the solar battery overlaps the antenna appears brighter than the position where the solar battery does not overlap the antenna. Consequently, the colors appear slightly different from each other between the position where the solar battery overlaps the antenna and the position where the solar battery does not overlap the antenna.

Therefore, even when the dial is viewed from the front surface side, the solar battery can be seen through the dial. Accordingly, the position where the solar battery overlaps the antenna appears brighter than the position where the solar battery does not overlap the antenna, thereby causing a problem in that the colors appear slightly different between the position where the solar battery overlaps the antenna and the position where the solar battery does not overlap the antenna.

SUMMARY

An advantage of some aspects of the invention is to provide an electronic timepiece which can improve an external appearance when a dial is viewed from a front surface side.

An electronic timepiece according to an aspect of the invention includes an optically transparent dial, a solar battery disposed on a rear surface side of the dial, and an antenna disposed on a rear surface side of the solar battery so as to receive a radio wave. The solar battery includes one or more solar cells for generating power and a first non-power generating section which transmits the radio wave received by the antenna. The solar cell includes a metal electrode, a semiconductor layer stacked on the dial side of the metal electrode, and a transparent electrode stacked on the dial side of the semiconductor layer. The metal electrode and the transparent electrode are not disposed in the first non-power generating section, and the semiconductor layer is disposed in at least a portion of the first non-power generating section. The solar battery further includes a non-conductive member which adjusts light transmittance on the dial side of the semiconductor layer in the first non-power generating section.

In the aspect of the invention, the first non-power generating section has the non-conductive member which adjusts the light transmittance on the dial side of the semiconductor layer. Accordingly, it is possible to reduce a difference between the amount of light reflected on the semiconductor layer in the first non-power generating section and emitted to the dial side and the amount of light reflected on the semiconductor layer in the solar cell, transmitted through the transparent electrode, and emitted to the dial side. In this manner, a difference in colors is substantially negligible between a region where at least a portion of the first non-power generating section of the solar battery is located and a region where the solar cell is located. A difference in colors can be substantially eliminated when the solar battery is viewed through the dial from a front surface of the dial. Therefore, an external appearance can be improved.

For example, in the first non-power generating section, when the dial is viewed from the front surface side, in a case where the dial overlaps a dial ring or a case included in the electronic timepiece and there is an invisible portion, the semiconductor layer and the non-conductive member may not be disposed in the invisible portion.

An electronic timepiece according to another aspect of the invention includes an optically transparent dial, a solar battery disposed on a rear surface side of the dial, and an antenna disposed on a rear surface side of the solar battery so as to receive a radio wave. The solar battery includes one or more solar cells for generating power and a first non-power generating section which transmits the radio wave received by the antenna. The solar cell includes a metal electrode, a semiconductor layer stacked on the dial side of the metal electrode, and a transparent electrode stacked on the dial side of the semiconductor layer. The metal electrode and the transparent electrode are not disposed in the first non-power generating section, and the semiconductor layer is disposed in at least a portion of the first non-power generating section. The solar battery further includes a colored non-conductive member on the dial side of the semiconductor layer in the first non-power generating section.

In the aspect of the invention, in the first non-power generating section, the colored non-conductive member is disposed on the dial side of the semiconductor layer. Accordingly, the non-conductive member is colored so as to have predetermined light transmittance. In this manner, it is possible to reduce a difference between the amount of the light reflected on the semiconductor layer in the first non-power generating section and emitted to the dial side and the amount of the light reflected on the semiconductor layer in the solar cell, transmitted through the transparent electrode, and emitted to the dial side. In this manner, a difference in colors is substantially negligible between a region where at least the portion of the first non-power generating section of the solar battery is located and a region where the solar cell is located. A difference in colors can be substantially eliminated when the solar battery is viewed through the dial from a front surface of the dial. Therefore, an external appearance can be improved.

Since the non-conductive member is colored, compared to a transparent case, the light transmittance is lower. Therefore, for example, in a case where the non-conductive member is set to have the light transmittance the same as that of the transparent electrode, compared to a case where the non-conductive member is transparent, the thickness of the non-conductive member can be thinned.

An electronic timepiece according to another aspect of the invention includes an optically transparent dial, a solar battery disposed on a rear surface side of the dial, and an antenna disposed on a rear surface side of the solar battery so as to receive a radio wave. The solar battery includes one or more solar cells for generating power and a first non-power generating section which transmits the radio wave received by the antenna. The solar cell includes a metal electrode, a semiconductor layer stacked on the dial side of the metal electrode, and a transparent electrode stacked on the dial side of the semiconductor layer, and a protective layer stacked on the dial side of the transparent electrode. The metal electrode and the transparent electrode are not disposed in the first non-power generating section, and the semiconductor layer and the protective layer are disposed in at least a portion of the first non-power generating section. The solar battery further includes a non-conductive member between the semiconductor layer and the protective layer in the first non-power generating section.

In the aspect of the invention, in the first non-power generating section, the non-conductive member different from the protective layer is disposed on the dial side of the semiconductor layer. Accordingly, it is possible to reduce a difference between the amount of the light reflected on the semiconductor layer in the first non-power generating section and emitted to the dial side and the amount of the light reflected on the semiconductor layer in the solar cell, transmitted through the transparent electrode and the protective layer, and emitted to the dial side. In this manner, a difference in colors is substantially negligible between a region where at least the portion of the first non-power generating section of the solar battery is located and a region where the solar cell is located. A difference in colors can be substantially eliminated when the solar battery is viewed through the dial from a front surface of the dial. Therefore, an external appearance can be improved.

An electronic timepiece according to another aspect of the invention includes an optically transparent dial, a solar battery disposed on a rear surface side of the dial, and an antenna disposed on a rear surface side of the solar battery so as to receive a radio wave. The solar battery includes one or more solar cells for generating power and a first non-power generating section which transmits the radio wave received by the antenna. The solar cell includes a metal electrode, a semiconductor layer stacked on the dial side of the metal electrode, a transparent electrode stacked on the dial side of the semiconductor layer, and a protective layer stacked on the dial side of the transparent electrode. The metal electrode, the transparent electrode, and the protective layer are not disposed in the first non-power generating section, and the semiconductor layer is disposed in at least a portion of the first non-power generating section. The solar battery further includes a non-conductive member on the dial side of the semiconductor layer in the first non-power generating section.

In the aspect of the invention, in the first non-power generating section, the non-conductive member different from the protective layer is disposed on the dial side of the semiconductor layer. Accordingly, it is possible to reduce the difference between the amount of the light reflected on the semiconductor layer in the first non-power generating section and emitted to the dial side and the amount of the light reflected on the semiconductor layer in the solar cell, transmitted through the transparent electrode and the protective layer, and emitted to the dial side. In this manner, a difference in colors is substantially negligible between a region where at least the portion of the first non-power generating section of the solar battery is located and a region where the solar cell is located. A difference in colors can be substantially eliminated when the solar battery is viewed through the dial from a front surface of the dial. Therefore, an external appearance can be improved.

The protective layer is not disposed in the first non-power generating section. Accordingly, compared to a case where the protective layer is disposed therein, the thickness of the first non-power generating section can be thinned.

An electronic timepiece according to another aspect of the invention includes an optically transparent dial, a solar battery disposed on a rear surface side of the dial, and an antenna disposed on a rear surface side of the solar battery so as to receive a radio wave. The solar battery includes one or more solar cells for generating power and a first non-power generating section which transmits the radio wave received by the antenna. The solar cell includes a metal electrode, a semiconductor layer stacked on the dial side of the metal electrode, a transparent electrode stacked on the dial side of the semiconductor layer, and a protective layer stacked on the dial side of the transparent electrode. The metal electrode and the transparent electrode are not disposed in the first non-power generating section, and the semiconductor layer and the protective layer are disposed in at least a portion of the first non-power generating section. The solar battery further includes a non-conductive member on the dial side of the protective layer in the first non-power generating section.

In the aspect of the invention, in the first non-power generating section, the non-conductive member is disposed on the dial side of the protective layer. Here, the light transmittance of the non-conductive member can be adjusted by changing the thickness of the non-conductive member. Therefore, since the thickness of the non-conductive member is adjusted, it is possible to reduce the difference between the amount of the light reflected on the semiconductor layer in the first non-power generating section and emitted to the dial side and the amount of the light reflected on the semiconductor layer in the solar cell, transmitted through the transparent electrode and the protective layer, and emitted to the dial side. In this case, since the non-conductive member is located closest to the dial side, the thickness is likely to be adjusted in this way. Accordingly, a difference in colors can be substantially eliminated between a region where at least the portion of the first non-power generating section of the solar battery is located and a region where the solar cell is located. Therefore, an external appearance can be improved.

An electronic timepiece according to another aspect of the invention includes an optically transparent dial, a solar battery disposed on a rear surface side of the dial, and an antenna disposed on a rear surface side of the solar battery so as to receive a radio wave. The solar battery includes one or more solar cells for generating power and a first non-power generating section which transmits the radio wave received by the antenna. The solar cell includes a metal electrode, a semiconductor layer stacked on the dial side of the metal electrode, a transparent electrode stacked on the dial side of the semiconductor layer, and a protective layer stacked on the dial side of the transparent electrode. The metal electrode and the transparent electrode are not disposed in the first non-power generating section, and the semiconductor layer and the protective layer are disposed in at least a portion of the first non-power generating section. The solar battery further includes a non-conductive member between the semiconductor layer and the protective layer in the first non-power generating section. The protective layer has a plurality of stacked layers.

In the aspect of the invention, in the first non-power generating section, the non-conductive member different from the protective layer is disposed on the dial side of the semiconductor layer. Accordingly, it is possible to reduce the difference between the amount of the light reflected on the semiconductor layer in the first non-power generating section and emitted to the dial side and the amount of the light reflected on the semiconductor layer in the solar cell, transmitted through the transparent electrode and the protective layer, and emitted to the dial side. In this manner, a difference in colors is substantially negligible between a region where at least the portion of the first non-power generating section of the solar battery is located and a region where the solar cell is located. A difference in colors can be substantially eliminated when the solar battery is viewed through the dial from the front surface of the dial. Therefore, an external appearance can be improved.

Furthermore, in the aspect of the invention, the protective layer has the plurality of stacked layers. In this manner, for example, the protective layer can be formed by stacking a layer using a film on a layer coated with a resin on the dial side of the transparent electrode and the non-conductive member. Accordingly, after a step difference between the transparent electrode and the non-conductive member is removed using the layer coated with the resin, the dial side of the layer coated with the resin can be covered using a film which is more uniform. In this manner, it is possible to unify the textures when the solar battery is viewed through the dial from the front surface side of the dial. Therefore, the external appearance can be more effectively improved.

In the electronic timepiece according to the aspect of the invention, it is preferable that an absorbance index of the non-conductive member is higher than an absorbance index of the protective layer.

According to the aspect of the invention, for example, compared to a case where the absorbance index of the non-conductive member is the same as the absorbance index of the protective layer, in a case where the non-conductive member is set to have the light transmittance the same as that of the transparent electrode, the thickness of the non-conductive member can be reduced.

In the electronic timepiece according to the aspect of the invention, it is preferable that the solar battery includes a plurality of the solar cells, that a second non-power generating section which is a cell division section in which the metal electrode and the transparent electrode are not disposed is disposed between the solar cells in the solar battery, and that the semiconductor layer is disposed in at least a portion of the second non-power generating section.

Normally, the semiconductor layer is not disposed in the second non-power generating section which is the cell division section.

In the aspect of the invention, the semiconductor layer is also disposed in at least a portion of the second non-power generating section which is the cell division section. Accordingly, a difference in colors can be reduced between a region where at least a portion of the second non-power generating section is located and a region where the solar cell is located.

For example, in the second non-power generating section, in a case where there is a portion where a dimension (width) along a facing direction of the solar cells adjacent to each other is equal to or smaller than a predetermined dimension, even if a color of the region where the above-described portion is located is different from a color of the region where the solar cell is located when the dial is viewed from the front surface side, a difference in colors is not conspicuous. Accordingly, the semiconductor layer may not be disposed in the above-described portion.

In the electronic timepiece according to the aspect of the invention, it is preferable that the non-conductive member is disposed on the dial side of the semiconductor layer in the second non-power generating section.

According to the aspect of the invention, it is possible to reduce the difference between the amount of the light reflected on the semiconductor layer in the second non-power generating section and emitted to the dial side and the amount of the light reflected on the semiconductor layer in the solar cell, transmitted through the transparent electrode, and emitted to the dial side. In this manner, the difference in colors is substantially negligible between the region where at least a portion of the second non-power generating section of the solar battery is located and the region where the solar cell is located. The difference in colors can be substantially eliminated when the solar battery is viewed through the dial from the front surface of the dial.

In the electronic timepiece according to the aspect of the invention, it is preferable that the non-conductive member disposed in the first non-power generating section and the non-conductive member disposed in the second non-power generating section are formed of the same material.

According to the aspect of the invention, for example, in a case where the non-conductive member disposed in the first non-power generating section and the non-conductive member disposed in the second non-power generating section are set to have the light transmittance the same as that of the transparent electrode, the thicknesses of the respective non-conductive members can be equal to each other. Accordingly, the respective non-conductive members can be formed all at once by means of coating, for example.

In the electronic timepiece according to the aspect of the invention, it is preferable that the solar battery includes a plurality of the solar cells, that a second non-power generating section which is a cell division section in which the metal electrode and the transparent electrode are not disposed is disposed between the solar cells in the solar battery, and that the semiconductor layer is not disposed in the second non-power generating section in which a dimension along a facing direction of the solar cells adjacent to each other is equal to or smaller than a predetermined dimension, in the second non-power generating section.

In the second non-power generating section which is the cell division section, in a case of the second non-power generating section where the dimension along the facing direction is equal to or smaller than the predetermined dimension, even if the color of the region where the second non-power generating section of the solar battery is located is different from the color of the region where the solar cell is located, the difference in color is not conspicuous. That is, there is substantially no difference in colors when the solar battery is viewed through the dial from the front surface side of the dial.

According to the aspect of the invention, the semiconductor layer is not disposed in the second non-power generating section. Accordingly, it is possible to suppress the occurrence of interference between the solar cells, and it is possible to further narrow an interval between the solar cells. In this manner, an area of each solar cell can be widened, and power generation capacity of the solar battery can be improved.

In the electronic timepiece according to the aspect of the invention, it is preferable that the solar cell is disposed inside an outer peripheral edge of the solar battery, that the solar battery includes a third non-power generating section between the solar cell and the outer peripheral edge, and that the metal electrode and the transparent electrode are not disposed in the third non-power generating section, and the semiconductor layer is disposed in at least a portion of the third non-power generating section.

In the aspect of the invention, the semiconductor layer is disposed in at least a portion of the third non-power generating section in the solar battery. Accordingly, a difference in colors is substantially negligible between a region where at least the portion of the third non-power generating section of the solar battery is located and a region where the solar cell is located. A difference in colors can be substantially eliminated when the solar battery is viewed through the dial from the front surface of the dial.

For example, in the third non-power generating section, when the dial is viewed from the front surface side, in a case where the dial overlaps the dial ring or the case included in the electronic timepiece and there is an invisible portion, the semiconductor layer may not be disposed in the invisible portion.

In the electronic timepiece according to the aspect of the invention, it is preferable that the non-conductive member is disposed on the dial side of the semiconductor layer in the third non-power generating section.

According to the aspect of the invention, it is possible to reduce the difference between the amount of the light reflected on the semiconductor layer in the third non-power generating section and emitted to the dial side and the amount of the light reflected on the semiconductor layer in the solar cell, transmitted through the transparent electrode, and emitted to the dial side. In this manner, the difference in colors is substantially negligible between the region where at least the portion of the third non-power generating section of the solar battery is located and the region where the solar cell is located. The difference in colors can be substantially eliminated when the solar battery is viewed through the dial from the front surface of the dial.

In the electronic timepiece according to the aspect of the invention, it is preferable that the non-conductive member disposed in the first non-power generating section and the non-conductive member disposed in the third non-power generating section are formed of the same material.

According to the aspect of the invention, for example, in a case where the non-conductive member disposed in the first non-power generating section and the non-conductive member disposed in the third non-power generating section are set to have the light transmittance the same as that of the transparent electrode, the thicknesses of the respective non-conductive members can be equal to each other. Accordingly, the respective non-conductive members can be formed all at once by means of coating, for example.

In the electronic timepiece according to the aspect of the invention, it is preferable that the first non-power generating section overlaps at least the antenna in a plan view when viewed from the dial side.

According to the aspect of the invention, the radio wave incident from the dial side of the antenna is not blocked by the electrode of the solar cell. Accordingly, for example, regardless of a type of the antenna such as a patch antenna and a bar antenna, receiving performance of the antenna can be improved.

In the electronic timepiece according to the aspect of the invention, it is preferable that the antenna is a patch antenna.

For example, the patch antenna is larger than the bar antenna. Accordingly, if the electrode is disposed in the solar battery, a portion having the poor receiving performance of the antenna increases in a wide range. That is, it is necessary to dispose the first non-power generating section in the wide range. Therefore, the difference in colors is substantially eliminated between the region where at least the portion of the first non-power generating section of the solar battery is located and the region where the solar cell is located. The difference in colors is substantially eliminated when the solar battery is viewed through the dial from the front surface of the dial. In this manner, the external appearance can be effectively improved.

In the electronic timepiece according to the aspect of the invention, it is preferable that the antenna is a patch antenna including a radiation electrode, that in a plan view when viewed from the dial side, the semiconductor layer and the transparent electrode smaller than the radiation electrode are disposed inside an outer peripheral edge of the radiation electrode in the solar battery, and that in the plan view, the first non-power generating section is disposed so as to surround the transparent electrode.

In the patch antenna, currents concentrate on the outer peripheral edge of the radiation electrode. Consequently, electric lines of force are generated from the outer peripheral edge. Accordingly, even if the electrode is disposed inside the outer peripheral edge of the solar battery in the plan view, the receiving performance of the antenna is less affected by the electrode. Therefore, in the aspect of the invention, the semiconductor layer and the transparent electrode are disposed at the position inside the outer peripheral edge in the solar battery, and the difference in color is reduced between the position inside the outer peripheral edge and the position where the solar cell is located. In this manner, the first non-power generating section is disposed at a position for surrounding the transparent electrode in the plan view.

According to this configuration, compared to a case where the first non-power generating section overlaps the antenna in a plan view, an area of the first non-power generating section can be reduced. In this manner, even if the colors are slightly different from each other between the position where the first non-power generating section of the solar battery is located and the position where the solar cell is located, this difference can be inconspicuous. Accordingly, for example, even in a case where the dial has the high light transmittance, the difference in colors can be substantially eliminated when the solar battery is viewed through the dial from the front surface of the dial. Therefore, the external appearance can be effectively improved.

In the electronic timepiece according to the aspect of the invention, it is preferable that in the plan view, the metal electrode smaller than the radiation electrode is disposed inside the outer peripheral edge of the radiation electrode in the solar battery.

In the solar battery, the light reflected on the metal electrode is emitted to the dial side after being transmitted through the semiconductor layer and the transparent electrode. Accordingly, though slightly, the colors are slightly differently viewed between a region having the metal electrode of the solar battery and a region having no metal electrode.

In the aspect of the invention, similar to the solar cell, the metal electrode, the semiconductor layer, and the transparent electrode are disposed inside the outer peripheral edge of the radiation electrode in the solar battery. Accordingly, the same color can be set between the region inside the outer peripheral edge of the radiation electrode of the solar battery and the region where the solar cell is located. Therefore, the difference in colors can be substantially eliminated when the solar battery is viewed through the dial from the front surface of the dial.

In the electronic timepiece according to the aspect of the invention, it is preferable that the first non-power generating section continuously extends to an outer peripheral edge of the solar battery in a plan view when viewed from the dial side, and that in the plan view, the first non-power generating section overlaps the antenna.

According to the aspect of the invention, compared to a case where the solar cell is disposed closer to the outer peripheral side of the solar battery than the first non-power generating section, the antenna can be located close to the case in the plan view. Therefore, the antenna can be more freely located.

In the electronic timepiece according to the aspect of the invention, it is preferable that in a plan view when viewed from the dial side, an outer peripheral edge of the antenna is surrounded by the solar cell.

According to the aspect of the invention, in the plan view, a region closer to the outer peripheral side than the antenna in the solar battery can be provided with a function as the solar cell. Accordingly, an area of the solar cell can be widened, and power generation capacity of the solar battery can be improved.

In the electronic timepiece according to the aspect of the invention, it is preferable that the solar battery includes a plurality of the solar cells, that in a plan view when viewed from the dial side, the solar cells respectively have a shape surrounded by two lines radially extending from a plane center of the solar battery and a line extending along an outer peripheral edge of the solar battery, and that in the plan view, the antenna is located at a position where the antenna does not overlap the solar cell.

In the aspect of the invention, each of the solar cells has a substantially fan shape in the plan view. According to this configuration, each of the solar cells can be easily designed to have the same area. In a case where patterning is performed on the metal electrode or the transparent electrode corresponding to each of the solar cells by means of laser processing, the length to be cut using the laser can be shortened to the minimum. Therefore, a manufacturing process can be shortened.

In the electronic timepiece according to the aspect of the invention, it is preferable that the solar battery includes a plurality of the solar cells, and that in a plan view when viewed from the dial side, the solar cell adjacent to the first non-power generating section is one of the solar cells.

In the aspect of the invention, the first non-power generating section disposed corresponding to an outer peripheral edge of the antenna is in contact with one of the solar cells.

Here, in a case where the first non-power generating section is in contact with two adjacent solar cells, it is necessary to provide a connection portion which electrically connects the adjacent solar cells to each other. This connection portion is disposed by avoiding the first non-power generating section. Accordingly, in many cases, the connection portion is disposed in the vicinity of the plane center of the solar battery. In this case, the connection portion may be transparently viewed in the vicinity of the plane center of the dial in the plan view when viewed from the dial side, thereby causing a possibility that the external appearance may be degraded.

On the other hand, in the aspect of the invention, one solar cell is in contact with the first non-power generating section. Accordingly, the connection portion is not disposed in the vicinity of the plane center of the solar battery. Therefore, since the connection portion is transparently viewed, it is possible to prevent the external appearance from being degraded.

In the electronic timepiece according to the aspect of the invention, it is preferable that the electronic timepiece includes a metal case.

According to the aspect of the invention, the antenna can receive the radio wave transmitted through the dial. Accordingly, the metal case can be used for the case. Therefore, the external appearance of the electronic timepiece can be improved.

In the electronic timepiece according to the aspect of the invention, it is preferable that the electronic timepiece includes a non-conductive bezel.

According to the aspect of the invention, compared to a case of including a conductive bezel, the receiving performance of the antenna can be improved.

BRIEF DESCRIPTION OF THE DRAWINGS

Embodiments of the invention will be described with reference to the accompanying drawings, wherein like numbers reference like elements.

DESCRIPTION OF EXEMPLARY EMBODIMENTS

Hereinafter, specific embodiments according to the invention will be described with reference to the drawings.

First Embodiment

An electronic timepiece 1 (refer to FIG. 1) according to the present embodiment is a wristwatch which corrects an internal time after receiving a radio wave (satellite signal) from a GPS satellite, and which displays the time on a side (front surface side) opposite to a side (rear surface side) in contact with the wrist of a user.

The GPS satellite is a navigation satellite which orbits in a predetermined orbit above the earth, and transmits a signal to the earth by superimposing a navigation message on the radio wave (L1 wave) of 1.57542 GHz. In the following description, the radio wave of 1.57542 GHz on which the navigation message is superimposed will be referred to as the satellite signal. The satellite signal is a circularly polarized wave of a right-handed polarized wave.

Approximately 30 GPS satellites exist. Each of the GPS satellites superimposes a unique pattern of 1,023 chips (cycle of 1 ms) called a coarse/acquisition code (C/A code) on the satellite signal so as to identify which GPS satellite transmits the satellite signal. In the C/A code, each chip is either +1 or −1, and looks like a random pattern. Therefore, the satellite signal and the pattern of each C/A code are correlated with each other. In this manner, it is possible to detect the C/A code superimposed on the satellite signal.

The GPS satellite is equipped with an atomic timepiece, and the satellite signal includes GPS time information measured by the atomic timepiece. The electronic timepiece 1 receives the satellite signal transmitted from one of the GPS satellites, and sets a time (time information) obtained using the GPS time information included in the satellite signal, as the internal time.

The satellite signal also includes orbit information indicating a position on the orbit of the GPS satellite. The electronic timepiece 1 can perform a positioning calculation by using the GPS time information and the orbit information. The positioning calculation is performed on a premise that a certain degree of error is included in the internal time of the electronic timepiece 1. That is, in addition to x, y, and z parameters for specifying a three-dimensional position of the electronic timepiece 1, a time error is also unknown. Therefore, the electronic timepiece 1 generally receives the satellite signals respectively transmitted from four or more GPS satellites, and performs the positioning calculation by using the GPS time information and the orbit information which are included in the satellite signals, thereby obtaining position information of a current position.

Schematic Configuration of Electronic Timepiece

Figure 1:
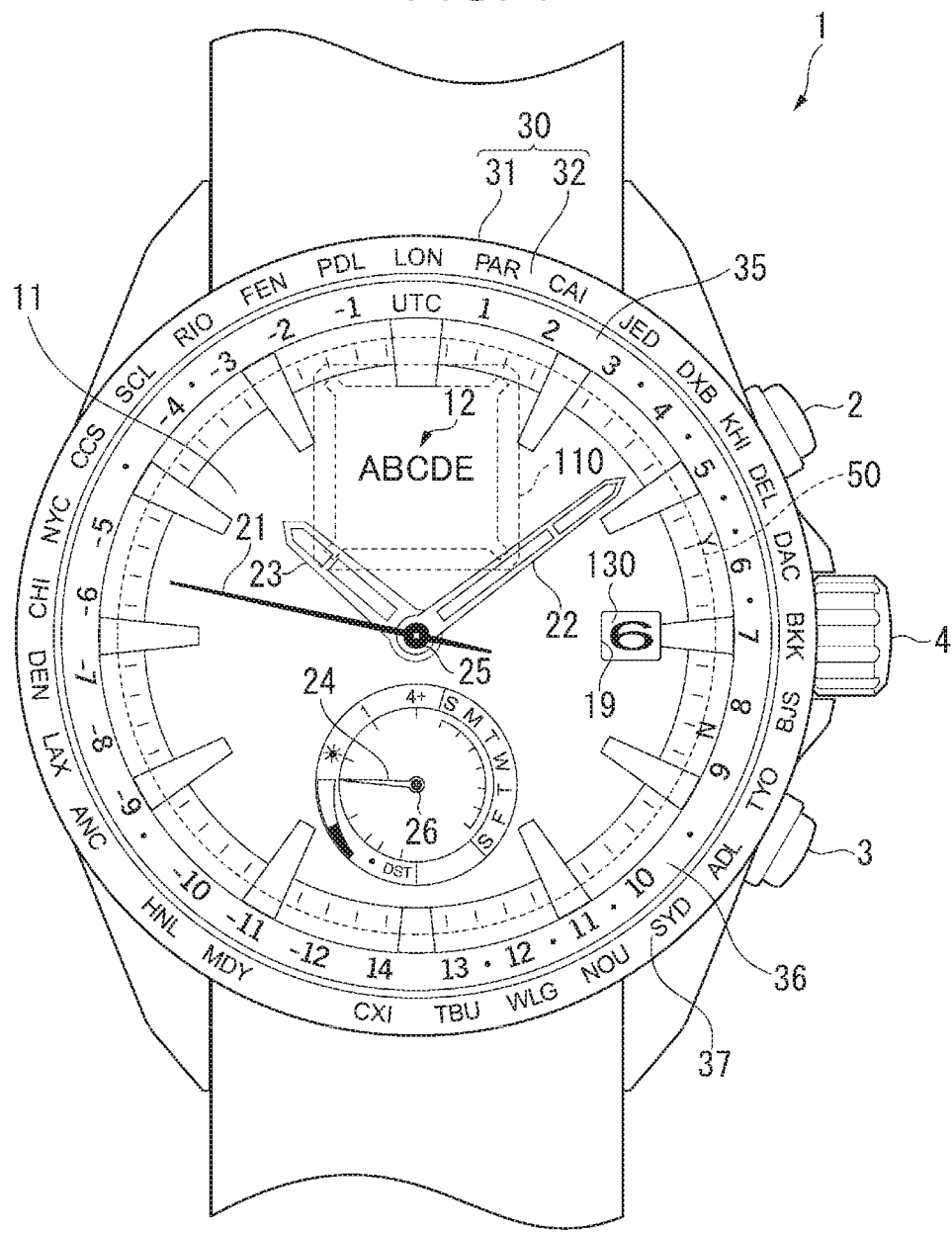
FIG. 1 is a plan view of an electronic timepiece according to a first embodiment of the invention.
Figure 2:
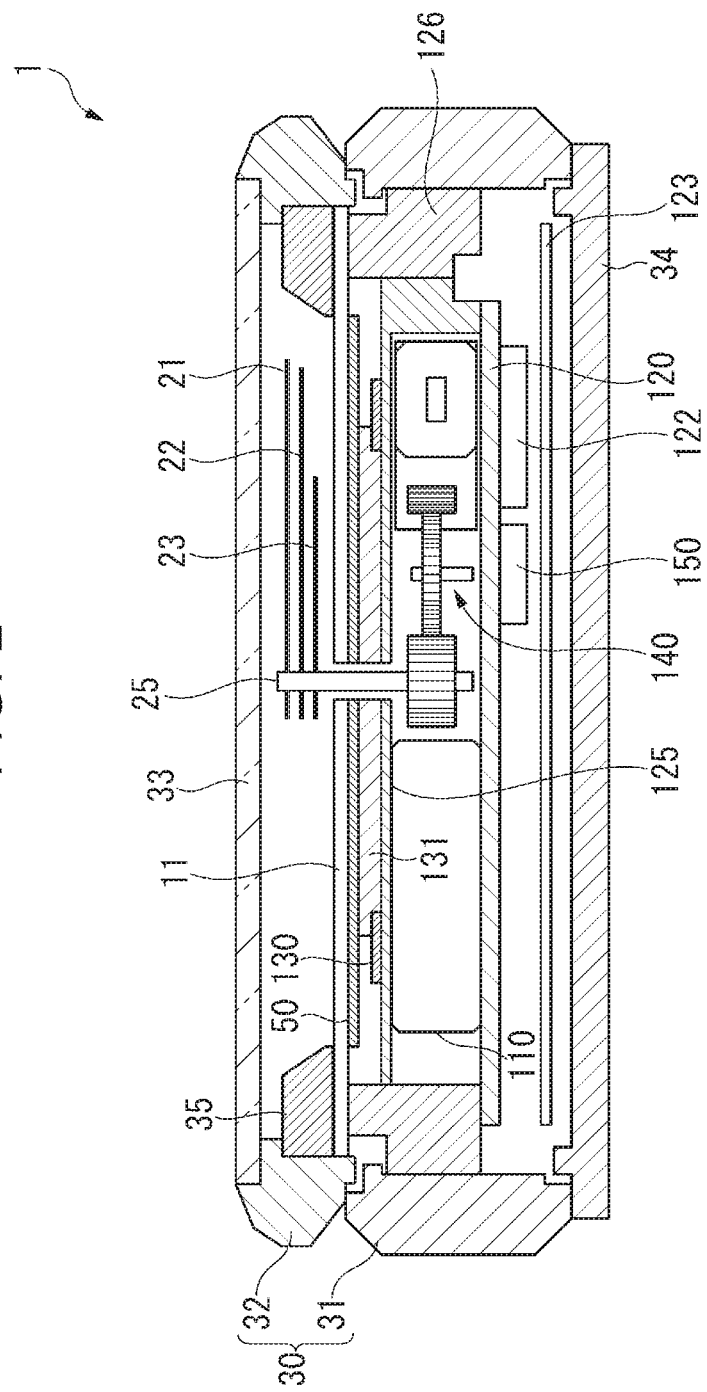
FIG. 2 is a sectional view of the electronic timepiece according to the first embodiment.

Next, a schematic configuration of the electronic timepiece 1 will be described. FIG. 1 is a plan view of the electronic timepiece 1. FIG. 2 is a sectional view of the electronic timepiece 1.

The electronic timepiece 1 includes an exterior case 30, a cover glass 33, and a case back 34. The exterior case 30 is configured so that a bezel 32 is fitted to a cylindrical case 31 formed of metal (metal case). The bezel 32 may be formed of metal or ceramic. If ceramic is used, the bezel 32 is non-conductive and low in conductivity. Accordingly, the bezel 32 does not shield the radio wave. On an inner peripheral side of the bezel 32, a ring-shaped dial ring 35 formed of a non-conductive resin and a disc-shaped dial 11 formed of a non-conductive member such as polycarbonate are disposed as time display portions.

On a side surface of the exterior case 30, an A-button 2 is disposed at a position in a 2 o'clock direction from a plane center of the dial 11, a B-button 3 is disposed at a position in a 4 o'clock direction, and a crown 4 is disposed at a position in a 3 o'clock direction.

An opening of a front surface side in two openings of the exterior case 30 is closed by the cover glass 33 via the bezel 32, and an opening of a rear surface side is closed by the case back 34 formed of metal.

Inside the exterior case 30, there are provided a dial ring 35 attached to an inner periphery of the bezel 32, an optically transparent dial 11, indicating hands 21, 22, 23, and 24, indicating hand axles 25 (three indicating hand axles disposed coaxially with each other) to which the indicating hands 21 to 23 are attached, and an indicating hand axle 26 to which the indicating hand 24 is attached. Furthermore, a solar battery 50, an antenna 110, a dial support 126, a main plate 125, a date indicator 130, a date indicator maintaining plate 131, and a drive mechanism 140 for driving the indicating hands 21 to 24 are provided (accommodated).

The indicating hand axle 25 is disposed along a central axis extending in a frontward-backward direction after passing through the plane center of the exterior case 30. The indicating hand axle 26 is disposed along the central axis after passing through a position shifted in a direction of a 6 o'clock direction from the center.

The dial ring 35 has an outer peripheral end which is in contact with an inner peripheral surface of the bezel 32, and includes a flat plate portion parallel to the cover glass 33 and an inclined portion inclined toward the dial 11 side.

The dial 11 is a circular plate member which displays the time inside the exterior case 30, is formed of an optically transparent material such as a resin which is a non-conductive material, and includes the indicating hands 21 to 24 between the cover glass 33 and the dial 11, and is located on the rear surface side from the dial ring 35.

The front surface side of the dial 11 has a logo 12. The logo 12 is a letter, a number, or a mark which indicates a product name or a manufacturer, and is formed of a non-conductive member such as the resin or a conductive member. The logo 12 may be formed by means of printing. If the logo 12 is located on the front surface side of solar cells 51 to 58 (to be described later) in the solar battery 50, the amount of the light incident on the solar cells 51 to 58 decreases. Accordingly, it is desirable to locate the logo 12 at a position where the logo 12 does not overlap the solar cells 51 to 58 in a plan view.

Here, viewing members configuring the electronic timepiece 1 in a direction perpendicular to the dial 11 will be referred to as the plan view.

In a case where the logo 12 is formed of a conductive member and overlaps the antenna 110 in the plan view, it is desirable that the logo 12 is located at the position where the logo 12 does not affect the reception of the radio wave, or that the logo 12 is formed to have a size which does not affect the reception of the radio wave. As long as the position or the size falls within a range which does not affect the reception of the radio wave, the logo 12 may overlap an outer peripheral edge of the radiation electrode 112 of the antenna 110.

The rear surface side of the dial 11 includes the solar battery 50. The solar battery 50 is located between the dial 11 and the main plate 125. When the solar battery 50 is viewed through the dial 11 from the front surface side of the dial 11, light transmittance of the dial 11 is set to approximately 30% or lower. Accordingly, the dial 11 is not completely transparent. In a case where a partial color difference exists in the solar battery 50, the color difference is recognizable. In a case where the partial color difference of the solar battery 50 slightly exists, the color difference is not recognized. The overall textures of the dial 11 are unified when viewed from the front surface side of the dial 11. In order that the solar battery 50 is less likely to be noticed through the front surface side of the dial 11, a semi-transmissive sheet through which the light is partially transmitted and on which the light is partially reflected may be disposed between the dial 11 and the solar battery 50.

The solar battery 50 has the plurality of solar cells 51 to 58 which performs photovoltaic power generation by converting light energy of the light incident through the dial 11 into electric energy (power). The solar battery 50 has a function to detect solar light. The details of the solar battery 50 will be described later.

The dial 11 is set to have high light transmittance in order to obtain more electric energy by using the solar battery 50. In order to further improve a uniform appearance, the dial 11 is set to have low light transmittance so that the solar battery 50 is less likely to be easily seen (e.g., transparently viewed). Even if the solar battery 50 is transparently viewed, if all of the colors of the solar battery 50 are uniform, the uniform appearance is not degraded. Accordingly, more solar energy can be obtained by increasing the light transmittance. If a great amount of solar energy can be accumulated in a secondary battery 128, it is possible to effectively utilize the battery life of the electronic timepiece 1 or a function which needs much current consumption such as GPS reception.

A guide plate (not illustrated) for fixing the solar battery 50 is disposed inside the exterior case 30. The guide plate has a positioning portion for positioning the solar battery 50. The guide plate is disposed on the rear surface side of the solar battery 50. The solar battery 50 is reinforced by the guide plate, thereby reducing warpage. The guide plate is formed of polycarbonate or a metal plate which is a non-conductive material. In a case where the guide plate is formed of the metal plate, the guide plate is formed in a shape which does not overlap the antenna 110 in the plan view so as not to shield the radio wave received by the antenna 110.

The rear surface side of the solar battery 50 is provided with the antenna 110 which receives the radio wave.

Figure 3:
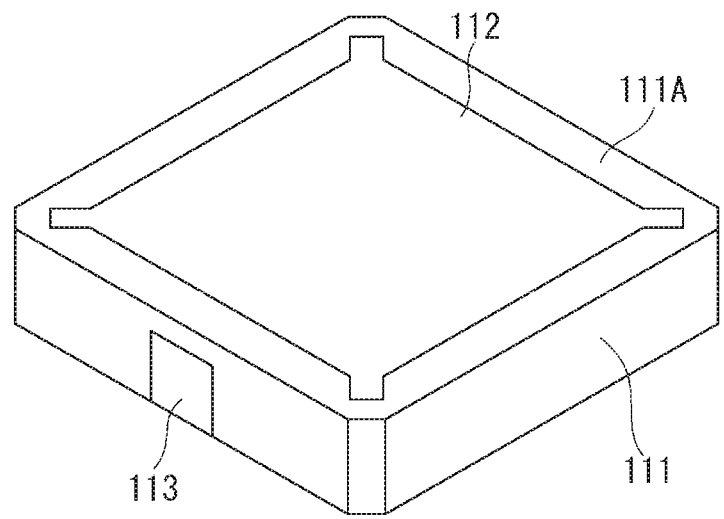
FIG. 3 is a perspective view of an antenna according to the first embodiment.
Figure 4:
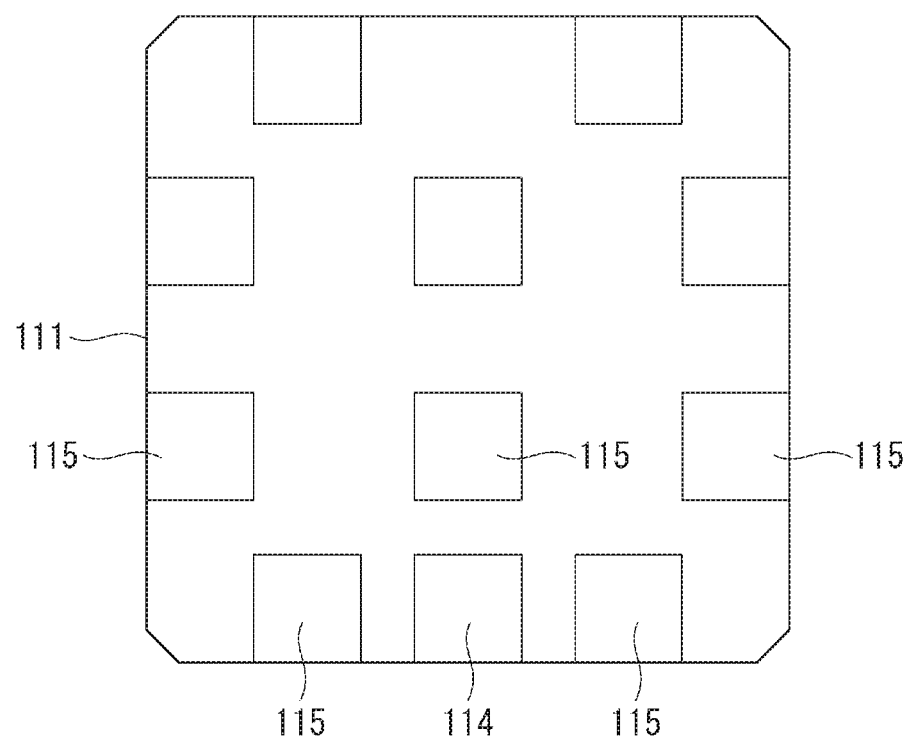
FIG. 4 is a plan view when the antenna according to the first embodiment is viewed from a rear surface side.

FIG. 3 is a perspective view of the antenna 110 when viewed from the front surface side, and FIG. 4 is a plan view of the antenna 110 when viewed from the rear surface side.

The GPS satellite transmits the satellite signal by using right-handed circular polarization. Therefore, the antenna 110 is configured to include the patch antenna (also called a microstrip antenna) which is excellent in circular polarization characteristics.

As illustrated in FIG. 3, the antenna 110 according to the present embodiment is the patch antenna in which the conductive radiation electrode 112 having a substantially square shape in a plan view is stacked on the front surface side of a ceramic dielectric base material 111 having a substantially square shape in a plan view. The radiation electrode 112 determines a frequency of the antenna 110 and polarization of a received signal.

The radiation electrode 112 is formed to be smaller than the dielectric base material 111. On the surface of the dielectric base material 111, an exposed surface 111A on which the radiation electrode 112 is not stacked is disposed around the radiation electrode 112.

As illustrated in FIG. 4, a power supply electrode 114 and a plurality of ground electrodes 115 are disposed on the rear surface side of the dielectric base material 111. As illustrated in FIG. 3, a side surface electrode 113 connected to the power supply electrode 114 is disposed on a side surface of the dielectric base material 111.

This antenna 110 can be manufactured as follows.

First, barium titanate having a relative dielectric constant of approximately 60 to 150 is used as a main raw material so as to be molded in a desired shape by using a pressing machine, and the dielectric base material 111 is generated through a firing process.

Thereafter, the radiation electrode 112 is formed by performing screen printing mainly on a paste material such as silver (Ag) on the front surface side of the dielectric base material 111. The side surface electrode 113, the power supply electrode 114, and the ground electrode 115 are formed in the same manner.

Figure 5:
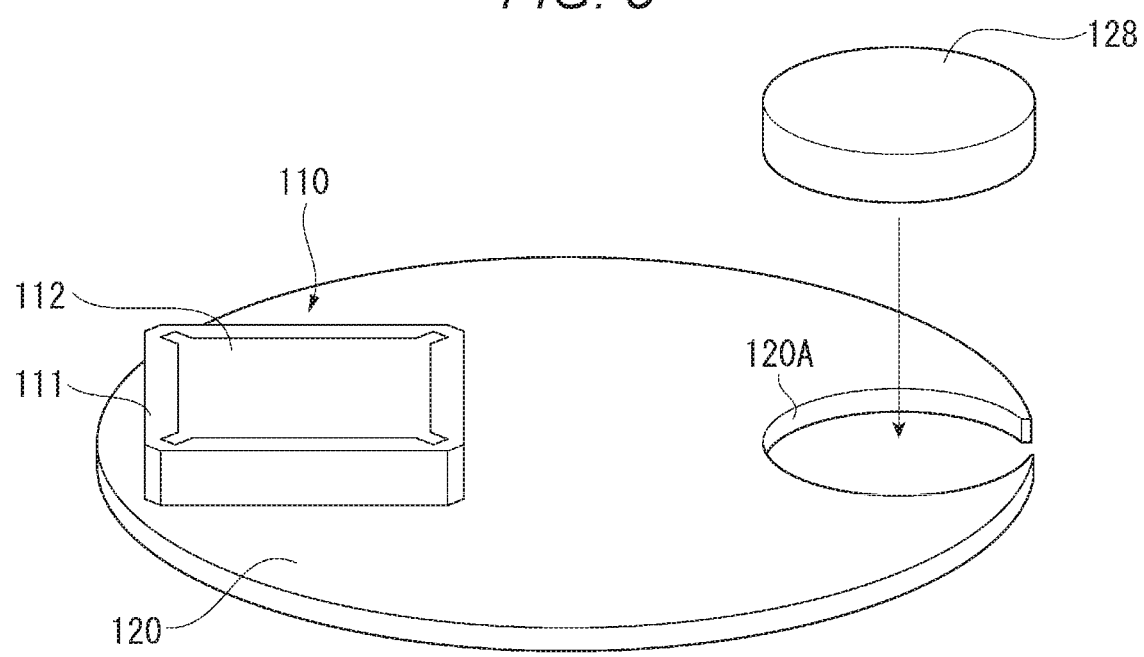
FIG. 5 is a view illustrating the antenna disposed in a circuit board according to the first embodiment.

Thereafter, as illustrated in FIG. 5, the antenna 110 manufactured in this way is mounted on the circuit board 120 formed in a disc shape. As illustrated in FIG. 5, the circuit board 120 is provided with a cutout portion 120A, and the secondary battery 128 is accommodated in the cutout portion 120A.

As illustrated in FIG. 2, the rear surface side of the dial 11 is further provided with the dial support 126 which holds the dial 11. The dial support 126 is formed of a resin. The dial support 126 has a ring shape extending entirely along an inner peripheral surface of the exterior case 30. The solar battery 50 is located inside the inner peripheral surface of the dial support 126 in a plan view.

The date indicator 130 and the date indicator maintaining plate 131 for holding the date indicator 130 are provided between the main plate 125 and the solar battery 50. The date indicator 130 and the date indicator maintaining plate 131 are formed of a non-conductive resin.

The dial 11, the solar battery 50, the date indicator maintaining plate 131, and the main plate 125 respectively have holes into which the indicating hand axles 25 and 26 penetrate. An opening of a small calendar window 19 (refer to FIG. 1) is formed in the dial 11 and the solar battery 50.

The main plate 125 is formed of a non-conductive resin, and has an attachment portion for the drive mechanism 140. The drive mechanism 140 is attached to the main plate 125, and is covered by the circuit board 120 from the rear surface side. The drive mechanism 140 has a train wheel such as a step motor and a gear, and the stepping motor rotates the indicating hand axles 25 and 26 via the train wheel so as to drive the indicating hands 21 to 24.

The circuit board 120 is provided with a GPS receiving unit 122, a control device 150, and the antenna 110. The circuit board 120 is connected to the secondary battery 128 (refer to FIG. 5) such as a lithium ion battery charged with electric power generated by the solar battery 50.

A circuit holder 123 is disposed on the rear surface side of the circuit board 120.

Display Mechanism of Electronic Timepiece

As illustrated in FIG. 1, a scale which divides an inner periphery into 60 pieces is marked on the inner peripheral side of the dial ring 35 surrounding the outer peripheral portion of the dial 11. This scale is used so that the indicating hand 21 normally displays "seconds", the indicating hand 22 displays "minutes', and the indicating hand 23 displays "hours".

In the dial ring 35, an alphabetical letter "Y" is marked at a position of 12 minutes, and an alphabetical letter "N" is marked at a position of 18 minutes. These English letters indicate reception (acquisition) results (Y: reception (acquisition) success, N: reception (acquisition) failure) of various pieces of information based on the satellite signal received from the GPS satellite. The indicating hand 21 indicates either "Y" or "N", and displays the reception result of the satellite signal. The reception results are displayed by pressing the A-button 2 for a time shorter than 1 second.

The indicating hand 24 is attached to the indicating hand axle 26 located at a position of 6 o'clock from the plane center of the dial 11. Numbers, English letters, and symbols are provided outside a rotation region of the indicating hand 24 in the dial 11. The indicating hand 24 indicates these so as to display information such as a battery residual amount, the day of the week, ON/OFF of DST, and light detection using the solar battery 50. The indicating hand 24 normally displays the battery residual amount.

The small calendar window 19 is disposed in an opening portion which opens the dial 11 in a rectangular shape. The number marked on the date indicator 130 is visible through the opening portion. This number represents the "date" of the year, month, and date. In order to match the opening portion of the dial 11, the solar battery 50 is also provided with an opening portion which is open in a rectangular shape.

Along the scale on the inner peripheral side of the dial ring 35, time difference information 36 indicating a time difference from the coordinated universal time (UTC) is marked with numbers and symbols other than the numbers. The time difference information 36 using the numbers is an integer time difference, and the time difference information 36 using the symbols is a time difference other than the integer. The time difference between the time displayed by the indicating hands 21 to 23 and the UTC can be confirmed using the time difference information 36 indicated by the indicating hand 21 by pressing the B-button 3.

In the bezel 32 disposed around the dial ring 35, city information 37 for indicating representative city names in a time zone using the standard time corresponding to the time difference of the time difference information 36 marked on the dial ring 35 is marked thereon together with the time difference information 36. Here, marking of the time difference information 36 and city information 37 will be referred to as a time zone display. In the present embodiment, the time zone displays equal to the number of the time zones used all over the world are marked thereon. The marking of the city names illustrated in FIG. 1 is an example, and the marking of the city names may be appropriately changed depending on a change in the time zones.

Circuit Configuration of Electronic Timepiece

Next, a circuit configuration of the electronic timepiece 1 will be described.

Figure 6:
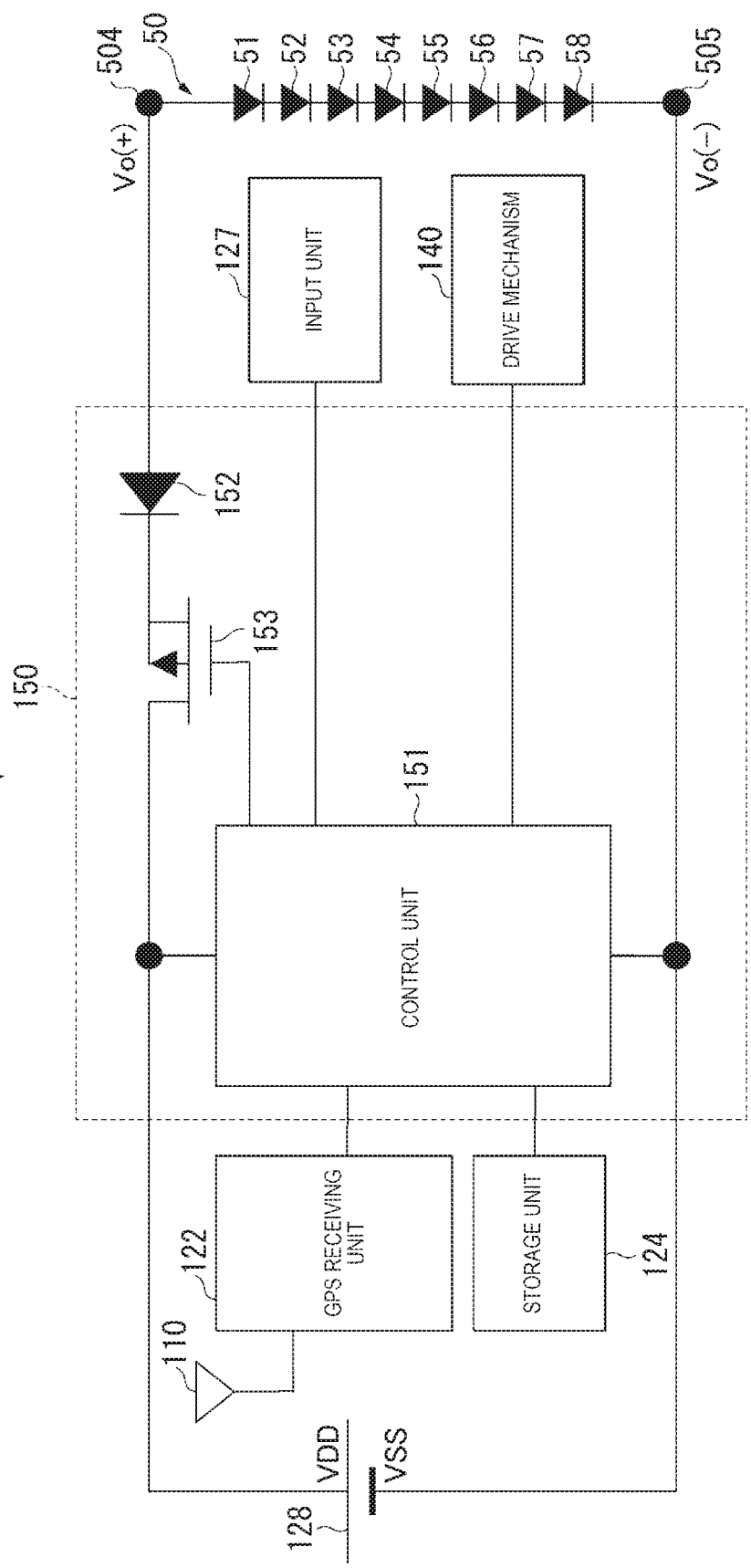
FIG. 6 is a view illustrating a circuit configuration of the electronic timepiece according to the first embodiment.

As illustrated in FIG. 6, the electronic timepiece 1 includes the control device (CPU) 150 having a control unit 151, a backflow prevention diode 152, and a charge control transistor 153 as a basic configuration, the GPS receiving unit 122, a storage unit 124, an input unit 127, and a peripheral device of the drive mechanism 140. Each of these devices transmits and receives data via a data bus. The input unit 127 is configured to include the A-button 2, the B-button 3, and the crown 4 which are illustrated in FIG. 1.

The backflow prevention diode 152 prevents currents from flowing from the secondary battery 128 to the solar battery 50 when the light is not emitted to the solar battery 50.

The charge control transistor 153 switches the solar battery 50 and the secondary battery 128 to a connected state or a disconnected state in accordance with an instruction of the control unit 151. The secondary battery 128 deteriorates if the secondary battery 128 is further charged from a fully charged state and to an overcharged state. In a case where a voltage of the secondary battery 128 reaches a predetermined voltage, the control unit 151 controls the charge control transistor 153 so as to be in the disconnected state. In this manner, the secondary battery 128 can be prevented from being in the overcharged state.

The GPS receiving unit 122 acquires the GPS time information or position information by processing the satellite signal received via the antenna 110. The antenna 110 receives the satellite signals which are transmitted from a plurality of the GPS satellites orbiting on a predetermined orbit in the sky above the earth and which pass through the cover glass 33. If the A-button 2 is pressed for 1 second or longer, the GPS receiving unit 122 performs a measured time receiving process for acquiring the GPS time information. If the A-button 2 is pressed for 3 seconds or longer, the GPS receiving unit 122 performs a measured position receiving process for acquiring the position information.

Although not illustrated, similar to an ordinary GPS device, the GPS receiving unit 122 includes an radio frequency (RF) unit for receiving the satellite signal transmitted from the GPS satellite and converting the satellite signal into a digital signal, a baseband unit (BB unit) for determining a correlation between the received signals so as to demodulate the navigation message, and an information acquisition unit for acquiring and outputting the GPS time information or the position information (measured position information), based on the navigation message (satellite signal) demodulated by the BB unit.

The RF unit includes a band pass filter, a PLL circuit, an IF filter, a voltage controlled oscillator (VCO), an A/D converter (ADC), a mixer, a low noise amplifier (LNA), and an IF amplifier. The satellite signal extracted from the band pass filter is amplified by the LNA. Thereafter, the satellite signal is mixed with a signal of the VCO by the mixer, and is down-converted to an intermediate frequency (IF). The IF mixed by the mixer passes through the IF amplifier and IF filter, and is converted to the digital signal by the ADC.

The BB unit includes a local code generation unit for generating a local code having the C/A code the same as that used in transmitting the satellite signal in the GPS satellite, and a correlation unit for calculating a correlation value between the local code and the received signal output from the RF unit. If the correlation value calculated by the correlation unit is equal to or greater than a predetermined threshold value, the C/A code used for the received satellite signal coincides with the generated local code. Accordingly, the satellite signal can be captured (synchronized). Therefore, it is possible to demodulate the navigation message through correlation processing on the received satellite signal by using the local code.

The information acquisition unit acquires the GPS time information and the position information, based on the navigation message demodulated by the BB unit. The navigation message includes preamble data, time of week (TOW, also called a "Z count") of the HOW word, and each subframe data. For example, the subframe data has subframe 1 to subframe 5, and each subframe includes satellite correction data including week number data and satellite health condition data, ephemeris (detailed orbit information for each of the GPS satellites), and almanac (schematic orbit information for all of the GPS satellites). Therefore, the information acquisition unit can acquire the GPS time information and the navigation information by extracting a predetermined portion of the data from the received navigation message.

The storage unit 124 stores a program executed by the control unit 151, and time zone information. The time zone information means data for managing the position information (latitude and longitude) of an area (time zone) using the common standard time and the time difference from the UTC.

The program stored in the storage unit 124 is executed so as to perform various calculations, controlling, and clocking. For example, the clocking is performed by counting the number of pulses of a reference signal transmitted from an oscillation circuit (not illustrated).

The control unit 151 corrects an internal time, based on the time information calculated from the GPS time information and the time correction parameter, the position information (latitude and longitude) of the current position calculated from the GPS time information and the orbit information, and the time zone information stored in the storage unit 124. The control unit 151 controls the drive mechanism 140 so as to cause the indicating hands 21 to 23 to display the internal time.

Configuration of Solar Battery

Figure 7:
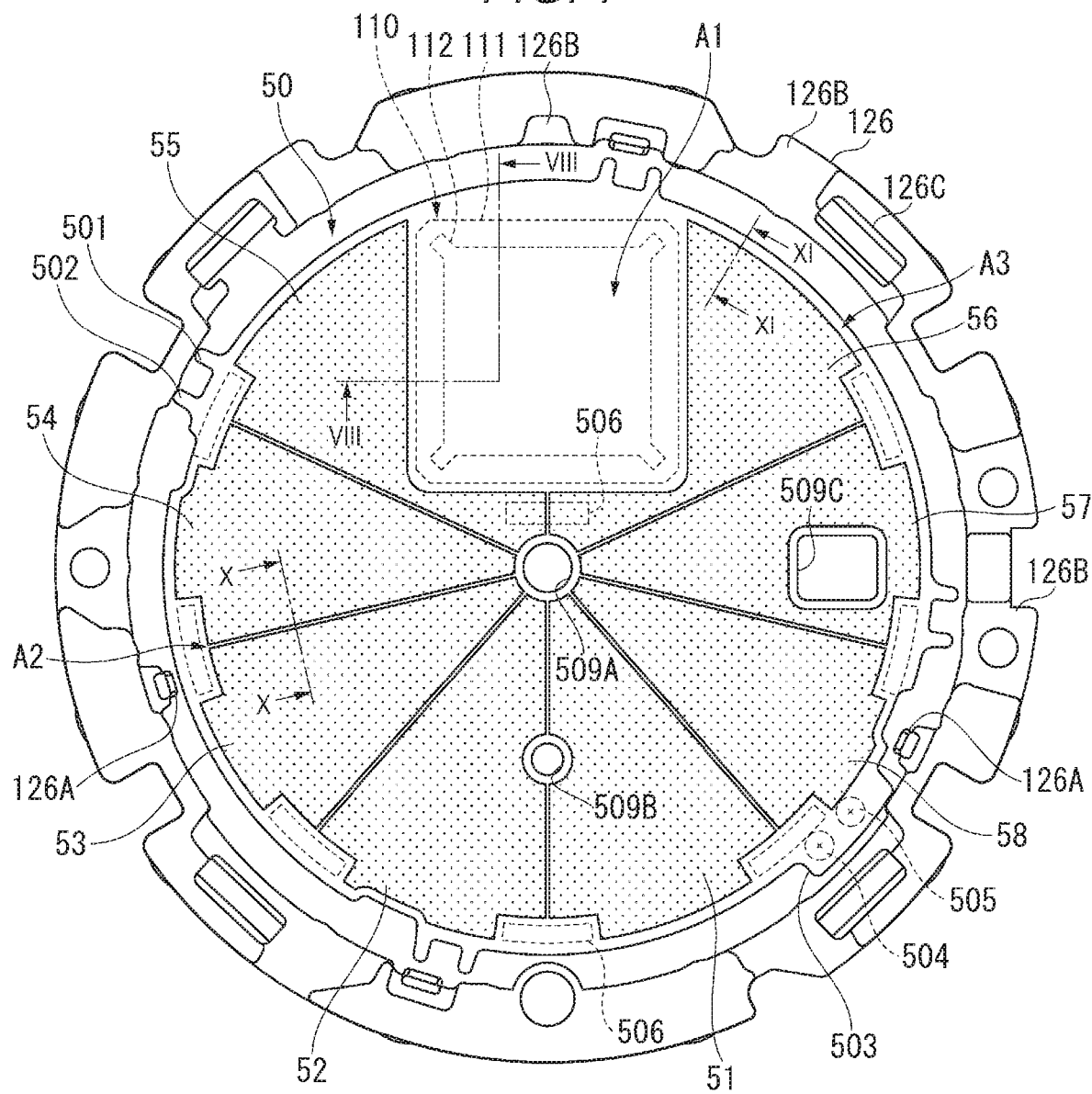
FIG. 7 is a plan view illustrating a solar battery and a dial support according to the first embodiment.
Figure 8:
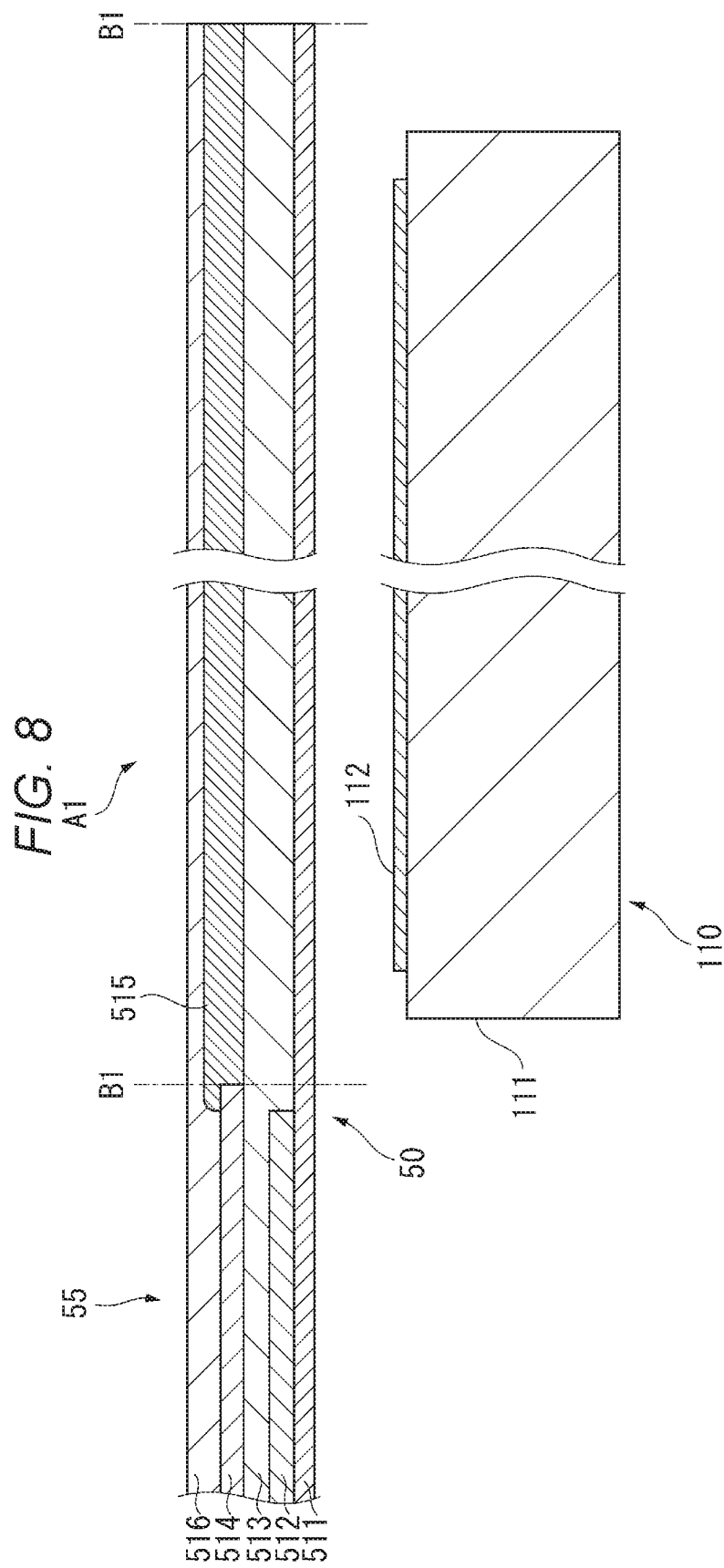
FIG. 8 is a sectional view of the solar battery and a first non-power generating section of the antenna according to the first embodiment.

Next, a configuration of the solar battery 50 will be described in detail. FIG. 7 is a plan view when the solar battery 50, the dial support 126, and the antenna 110 are viewed from the front surface side. FIG. 8 is a sectional view taken along line VIII-VIII in FIG. 7.

As illustrated in FIG. 7, the solar battery 50 is formed in a disc shape, and is disposed on the inner peripheral side of the dial support 126 formed in an annular shape.

The dial support 126 is provided with a solar battery hooking portion 126A for fixing the solar battery 50. The solar battery 50 is fixed to the dial support 126 by engaging an engagement portion of the guide plate (not illustrated) disposed in the solar battery 50 with the solar battery hooking portion 126A. The solar battery 50 may be configured to be directly supported by the dial support 126 without disposing the guide plate therein. In the present embodiment, there is no cutout in the solar battery 50 at a position where the solar battery 50 overlaps the antenna 110 in a plan view, for example. Accordingly, compared to a case where the cutout is present, the solar battery 50 is likely to be held by the dial support 126.

The dial support 126 is provided with a main plate support 126B which supports the main plate 125. The main plate support 126B is disposed at a position corresponding to hoods (not illustrated) belonging to the main plate 125, and the hoods are fitted together.

The solar battery 50 is provided with a protruding portion 503 protruding outward from the outer peripheral edge. The protruding portion 503 is provided with connection terminals 504 and 505. A conductive spring is connected to the connection terminals 504 and 505. The conductive spring is a wiring member for electrically connecting the circuit board 120 and the solar battery 50 to each other.

The solar battery 50 is provided with a through-hole 509A into which the indicating hand axle 25 is inserted, a through-hole 509B into which the indicating hand axle 26 is inserted, and an opening portion 509C corresponding to the small calendar window 19.

As illustrated in FIG. 8, the solar battery 50 includes a film substrate 511, a metal electrode 512, a semiconductor layer 513, a transparent electrode 514, a resin layer 515, and a protective layer 516 which are sequentially stacked in a direction from the case back 34 toward the dial 11. The transparent electrode 514 and the resin layer 515 are disposed on the same layer.

The film substrate 511 is formed of a resin film such as polyethylene and polyimide. Here, the outer peripheral edge of the solar battery 50 when viewed from the dial 11 side coincides with the outer peripheral edge of the film substrate 511.

The metal electrode 512 is formed of a conductor including a metal material such as aluminum and stainless steel. The metal electrode 512 is selectively formed at a position corresponding to the solar cells 51 to 58 (to be described later) by means of sputtering, for example. The metal electrode 512 may be formed by patterning the metal electrode 512 through laser processing.

The semiconductor layer 513 is formed so that an i-type semiconductor is interposed between a p-type semiconductor and an n-type semiconductor. Pure silicon used as a semiconductor material is an insulator. If an impurity is added, resistivity is lowered, and the pure silicon turns into the p-type semiconductor or the n-type semiconductor. For example, the p-type semiconductor is obtained by adding boron (B) serving as the impurity to the silicon. The n-type semiconductor is obtained by adding phosphorous (P) or arsenic (As) serving as the impurity to the silicon. The i-type semiconductor is an intrinsic semiconductor to which the impurity is not added to the silicon. Each semiconductor is in a state where atoms are irregularly arranged, that is, in an amorphous state. Since each semiconductor is brought into the amorphous state, the semiconductor can absorb more light. Accordingly, even in a case of a thin film, the semiconductor can generate power. Each semiconductor is formed by adding hydrogen so as to improve power generation performance. For example, each semiconductor is formed using a plasma CVD method.

The transparent electrode 514 is formed of a conductive material containing zinc oxide, indium oxide, or tin oxide. A representative material includes indium tin oxide (ITO). For example, the transparent electrode 514 is selectively formed at a position corresponding to the solar cells 51 to 58 (to be described later) by means of sputtering. Alternatively, the transparent electrode 514 may be formed by means of patterning through laser processing.

Here, if the light transmitted through the transparent electrode 514 is incident on the semiconductor layer 513 which is a photoelectric conversion layer, electrons and positive holes are generated in the i-type semiconductor by the energy of the light. The generated electrons and positive holes respectively move in the directions of the p-type semiconductor and the n-type semiconductor. As a result, currents flow to an external circuit connected to the transparent electrode 514 and the metal electrode 512. In this way, the photovoltaic power generation is performed.

That is, a portion where the metal electrode 512, the semiconductor layer 513, and the transparent electrode 514 overlap one another configures the solar cell which performs the photovoltaic power generation.

In the present embodiment, as illustrated in FIG. 7, the solar battery 50 has the eight solar cells 51 to 58.

As illustrated in FIG. 6, the solar cells 51 to 58 are connected in series between the connection terminals 504 and 505. As illustrated in FIG. 7, the respective solar cells 51 to 58 are connected to each other by the connection portion 506. The connection portion 506 connects the metal electrode 512 of one solar cell of the adjacent solar cells and the transparent electrode 514 of the other solar cell to each other.

An electromotive voltage of one solar cell is 0.7 V or higher. Accordingly, the solar battery 50 can obtain the electromotive voltage of 5.6 V (0.7 V×8 solar cells) or higher. The electromotive voltage can be fetched by the connection terminals 504 and 505.

The number of the solar cells may be determined so as to provide a desired voltage to charge the secondary battery 128. In the present embodiment, the secondary battery 128 employs a lithium-ion battery of 3.7V. Accordingly, the secondary battery 128 can be charged if 6 or more solar cells are used. However, the present embodiment is configured to use 8 solar cells so that the secondary battery 128 can be charged with a sufficient margin even if the electromotive voltage is low at low illumination.

Here, a distance in which an electromagnetic field incident on a certain material attenuates to 1/e will be referred to as a skin depth, and the radio wave is less likely to pass through the material having a shallower skin depth. A permeability μ and a skin depth d of a conductor having a conductivity σ with respect to the radio wave of a frequency f are expressed by Equation 1 below. A relationship between the conductivity σ and a resistivity ρ is a reciprocal relationship.

$$d = \frac{1}{\sqrt{\pi f \mu \sigma}} = \sqrt{\frac{\rho}{\pi f \mu}} \tag{1}$$

According to Equation 1, as the frequency f of the radio wave becomes higher, the skin depth d becomes shallower. That is, as the frequency f is higher, the radio wave is less likely to pass through the material. As the conductivity σ is higher (resistivity ρ is lower), the skin depth is more greatly affected. Particularly in a case of a metal material, the conductivity σ is high (resistivity ρ is low). Accordingly, the skin depth becomes shallower. If the skin depth becomes shallower, a shielding effect acts more greatly. That is, a microwave whose frequency f is high is less likely to pass through the conductor such as metal whose conductivity σ is high (resistivity ρ is low).

The metal electrode 512 and the transparent electrode 514 which are included in the configuration of the solar cells 51 to 58 have high conductivity. For example, the conductivity of the metal electrode 512 is $10^6$ S/cm (resistivity is $10^{-6}$ Ωcm), and the conductivity of the transparent electrode 514 is $10^4$/cm (resistivity is $10^{-4}$ Ωcm). Accordingly, the metal electrode 512 and the transparent electrode 514 attenuate the microwave due to the shielding effect.

Therefore, in the present embodiment, as illustrated in FIGS. 7 and 8, the solar battery 50 includes a first non-power generating section A1 where the metal electrode 512 and the transparent electrode 514 are not disposed, at a position where the solar battery 50 overlaps the antenna 110 in a plan view. The solar cells 51 to 58 are disposed at positions excluding the first non-power generating section A1. A one-dot chain line B1 in FIG. 8 represents an outer peripheral edge of the first non-power generating section A1.

In the present embodiment, in order to more reliably suppress the shielding effect, the outer peripheral edge of the first non-power generating section A1 is separated by as much as 1 mm or more in a plan view from the outer peripheral edge of the radiation electrode 112 of the antenna 110. The first non-power generating section A1 continuously extends to the outer peripheral edge of the solar battery 50.

That is, the first non-power generating section A1 is a region of the solar battery 50 through which the radio wave received by the antenna 110 is transmitted without attenuation due to the presence of either the metal electrode 512 or the transparent electrode 514.

The solar cells 55 and 56 are disposed adjacent to the first non-power generating section A1 in a plan view. The solar cells 55 and 56 have an edge extending outward from the plane center of the solar battery 50 and bending along the outer peripheral edge of the antenna 110, an edge radially extending from the plane center, and an edge circumferentially extending along the outer peripheral edge of the solar battery 50.

In a plan view, the other solar cells 51 to 54, 57, and 58 have two edges radially extending from the plane center and an edge circumferentially extending along the outer peripheral edge of the solar battery 50. That is, the solar cells 51 to 54, 57, and 58 have a substantially fan (pie piece or pizza slice) shape in the plan view. That is the solar cells 51 to 54, 57, and 58 are sectors including two radii and their intercepted arc.

Here, the semiconductor layer 513 is formed of silicon. Accordingly, the semiconductor layer 513 has a dark blue color, a blue purple color, or a dark gray color. Therefore, when the dial 11 is viewed from the front surface side, the color of the semiconductor layer 513 is viewable through the dial 11 and the transparent electrode 514. If there is a portion having no semiconductor layer 513, the color of the portion appears different from the color of the portions having the semiconductor layer 513. Therefore, in the present embodiment, as illustrated in FIG. 8, the semiconductor layer 513 is also disposed in the first non-power generating section A1 so as to reduce a difference in colors between the region where the solar cells 51 to 58 are located and the region where the first non-power generating section A1 is located. That is, the film substrate 511 and the semiconductor layer 513 are stacked at the position of the first non-power generating section A1, and the metal electrode 512 and the transparent electrode 514 are not disposed therein.

The semiconductor layer 513 has low conductivity (high resistivity). For example, the conductivity of the i-type semiconductor which is the thickest in the semiconductor layer 513 is $10^{-2}$ S/cm or lower (resistivity is $10^{2}$ Ωcm or higher). Therefore, sufficient radio wave permeability can be obtained by setting the thickness to be 800 nm or shorter, for example. Therefore, the satellite signal propagated from the front surface side of the timepiece passes through the non-conductive cover glass 33. Thereafter, the satellite signal passes through the non-conductive dial 11, the semiconductor layer 513 of the solar battery 50, the non-conductive date indicator maintaining plate 131, the date indicator 130 and the main plate 125, and is incident on the antenna 110. In this case, the satellite signal is not blocked by the electrodes of the solar battery 50. Since the indicating hands 21 to 23 have a small area overlapping the antenna 110, even if the indicating hands 21 to 23 are made of metal, receiving the satellite signal is not hindered. If the indicating hands 21 to 23 are formed of the non-conductive member, which is preferable, then an influence of the satellite signal being blocked is further avoided.

Furthermore, in the present embodiment, as illustrated in FIG. 8, the non-conductive resin layer 515 (non-conductive member) is disposed on the front surface side of the semiconductor layer 513 where the transparent electrode 514 is not disposed in the first non-power generating section A1 so as to reduce a difference in colors between the region where the solar cells 51 to 58 are located and the region where the first non-power generating section A1 is located.

Figure 9:
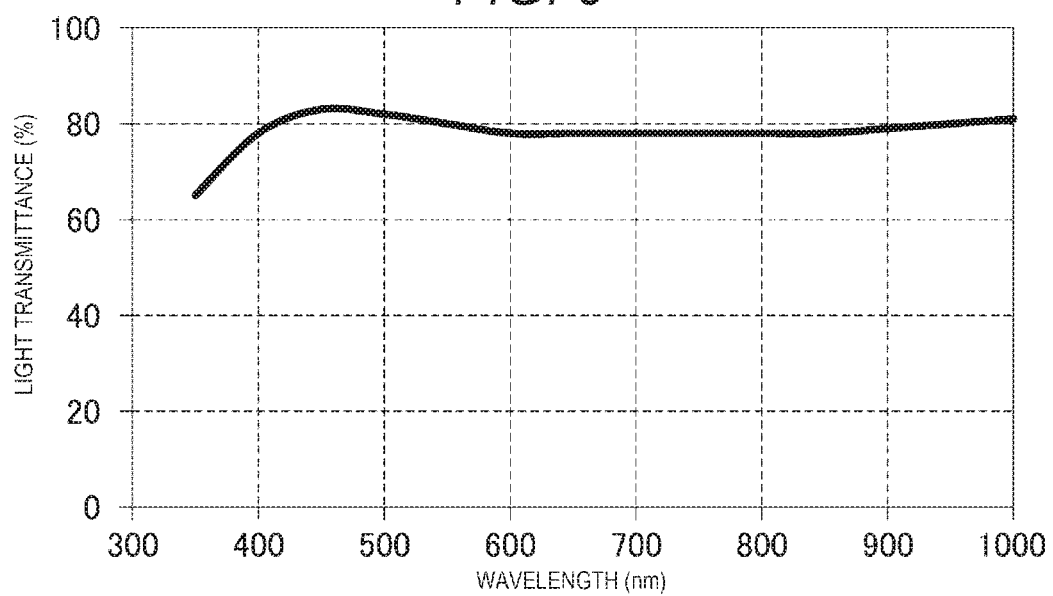
FIG. 9 is a graph illustrating light transmittance of a transparent electrode.

That is, in the region where the solar cells 51 to 58 are located, the light incident on the semiconductor layer 513 from the dial 11 side and a portion of the light reflected to the dial 11 side by the semiconductor layer 513 are absorbed by the transparent electrode 514 without passing through the transparent electrode 514. As illustrated in the graph in FIG. 9, the light transmittance of the transparent electrode 514 is approximately 80% in a wavelength range (380 nm to 780 nm) of visible light. That is, approximately 80% of the light incident on the transparent electrode 514 is transmitted, and the remaining light is absorbed.

In the region where the first non-power generating section A1 is located, the light incident on the semiconductor layer 513 from the dial 11 side and the light reflected to the dial 11 side by the semiconductor layer 513 are not absorbed by the transparent electrode 514. Therefore, if no resin layer 515 is present, the region where the first non-power generating section A1 of the solar battery 50 is located appears brighter than the region where the solar cells 51 to 58 are located. In this case, the colors are slightly different from each other between the region where the first non-power generating section A1 is located and the region where the solar cells 51 to 58 are located. Therefore, even when the dial 11 is viewed from the front surface side, the colors appear slightly different.

Therefore, in the present embodiment, the resin layer 515 having a light transmittance that is the same as that of the transparent electrode 514 is disposed on the front surface side of the semiconductor layer 513 of the first non-power generating section A1. In this manner, a difference between the amount of the light reflected on the semiconductor layer 513 in the first non-power generating section A1 and emitted to the dial 11 side, and the amount of the light reflected on the semiconductor layer 513 in the solar cells 51 to 58, transmitted through the transparent electrode 514, and emitted to the dial 11 side is greatly reduced or eliminated. Therefore, the difference in colors is substantially negligible between the region where the first non-power generating section A1 of the solar battery 50 is located and the region where the solar cells to 58 are located. The difference in colors is substantially eliminated when the dial 11 is viewed from the front surface side. That is, the resin layer 515 adjusts or regulates the light transmittance.

As an example, materials of the resin layer 515 can include non-conductive resins such as a phenol resin, an epoxy resin, a polyimide resin, a urethane resin, a phenoxy resin, a nitrocellulose resin, a vinyl resin, a polyester resin, a polyethylene resin, an acrylic resin, a polyamide resin, and a silicone resin. For example, the resin layer 515 is formed by means of coating or printing.

Here, the resin layer 515 is colored by adding a coloring material such as a pigment. The amount or the thickness of the coloring material is adjusted, thereby forming the resin layer 515 so that the light transmittance is the same as that of the transparent electrode 514. As the color, a color close to the color of the semiconductor layer 513 is used. Instead of the resin layer 515, other non-conductive members can be used.

An absorbance index of the resin layer 515 is preferably higher than an absorbance index of the protective layer 516 (to be described later).

As illustrated in FIG. 7, in the present embodiment, in the solar battery 50, a second non-power generating section A2 is located between adjacent solar cells 51 to 58. The second non-power generating section A2 is a cell division section where the metal electrode 512 and the transparent electrode 514 are not disposed. Herein, a configuration of the second non-power generating section A2 located between the solar cells 53 and 54 will be described as a representative example.

Figure 10:
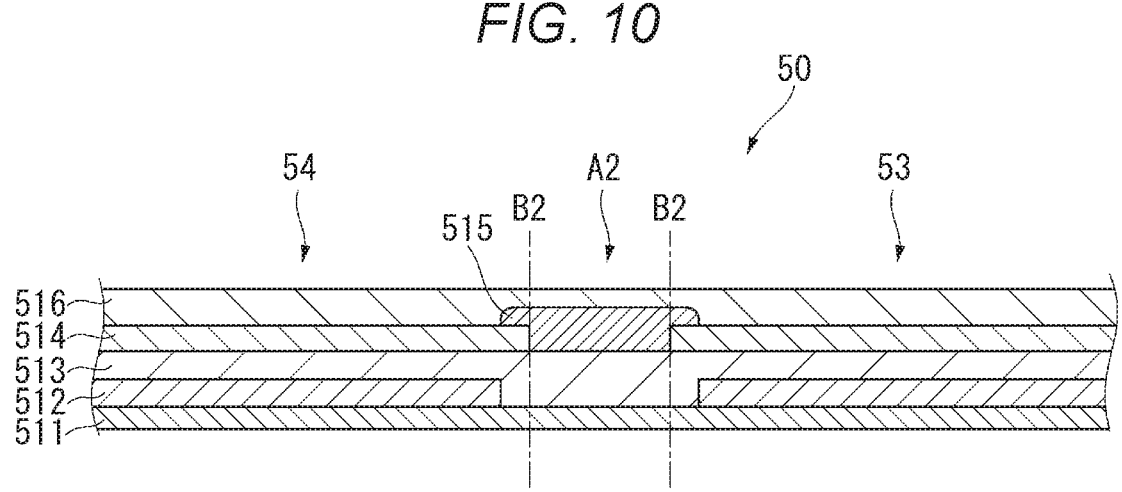
FIG. 10 is a sectional view of a second non-power generating section of the solar battery according to the first embodiment.

FIG. 10 is a sectional view taken along line X-X in FIG. 7. A one-dot chain line B2 in FIG. 10 represents the outer peripheral edge of the second non-power generating section A2.

As illustrated in FIG. 10, in the present embodiment, the semiconductor layer 513 is also disposed in the second non-power generating section A2. That is, the second non-power generating section A2 is provided with the film substrate 511 and the semiconductor layer 513, and is not provided with the metal electrode 512 and the transparent electrode 514. The resin layer 515 is disposed on the front surface side of the semiconductor layer 513 of the second non-power generating section A2. Here, the resin layer 515 is formed using the material and the thickness which are the same as those of the resin layer 515 disposed in the first non-power generating section A1, and has a light transmittance that is the same as that of the transparent electrode 514.

The other second non-power generating sections A2 between the solar cells 51 to 58 are configured in the same manner.

In this manner, the difference in colors is substantially eliminated among the region where the second non-power generating section A2 of the solar battery 50 is located, the region where the solar cells 51 to 58 are located, and the region where the first non-power generating section A1 is located. Therefore, the difference in colors can be substantially eliminated when the dial 11 is viewed from the front surface side.

As illustrated in FIG. 7, in the present embodiment, the solar cells 51 to 58 are disposed inside the outer peripheral edge of the solar battery 50. A third non-power generating section A3 in which the metal electrode 512 and the transparent electrode 514 are not disposed is located between the periphery of the solar cells 51 to 58 and the outer peripheral edge of the solar battery 50. Here, a configuration of the third non-power generating section A3 located between the solar cell 56 and the outer peripheral edge of the solar battery 50 will be described as a representative example.

Figure 11:
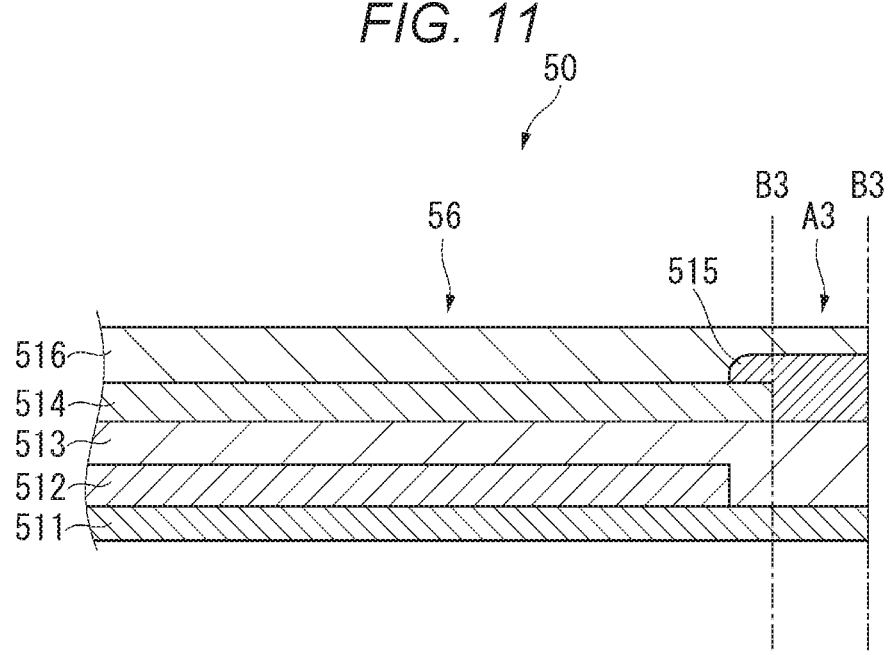
FIG. 11 is a sectional view of a third non-power generating section of the solar battery according to the first embodiment.

FIG. 11 is a sectional view taken along line XI-XI in FIG. 7. A one-dot chain line B3 in FIG. 11 represents the outer peripheral edge of the third non-power generating section A3.

As illustrated in FIG. 11, in the present embodiment, the semiconductor layer 513 is also disposed in the third non-power generating section A3. That is, the third non-power generating section A3 is provided with the film substrate 511 and the semiconductor layer 513, and is not provided with the metal electrode 512 and the transparent electrode 514. The resin layer 515 is disposed on the front surface side of the semiconductor layer 513 of the second non-power generating section A2. Here, the resin layer 515 is formed using the material and the thickness which are the same as those of the resin layer 515 disposed in the first non-power generating section A1 and the second non-power generating section A2, and has a light transmittance that is the same as that of the transparent electrode 514.

The third non-power generating section A3 located between the solar cells 51 to 55, 57, and 58 and the outer peripheral edge of the solar battery 50 is configured in the same manner.

In this manner, the change in colors can be substantially eliminated among the region where the third non-power generating section A3 of the solar battery 50 is located, the region where the solar cells 51 to 58 are located, the region where the first non-power generating section A1 is located, and the region where the second non-power generating section A2 is located. Therefore, the difference in colors can be substantially eliminated when the dial 11 is viewed from the front surface side.

The protective layer 516 is formed of a non-conductive resin having excellent strength in order to protect the semiconductor layer 513 and the transparent electrode 514. In the present embodiment, as illustrated in FIGS. 8, 10, and 11, the protective layer 516 is disposed on the front surface side of the transparent electrode 514 and the resin layer 515. The protective layer 516 is formed by means of coating, for example.

It is preferable that the protective layer 516 is formed of a colorless and transparent resin having high light transmittance in order to increase the amount of the light incident on the solar battery 50.

Examples of this resin include a polyethylene resin, an acrylic resin, and a polyester resin. A plurality of the protective layers 516 may be formed of one or more different of materials.

If the light is reflected on the surface of the protective layer 516, spectroscopic light thereof does not reach the semiconductor layer 513. Accordingly, the surface of the protective layer 516 may be subjected to an anti-reflection treatment in order to suppress the reflection as much as possible.

The resin layer 515 and the protective layer 516 are configured to include the non-conductive member. Accordingly, the radio wave incident from the dial 11 side is transmitted therethrough. Therefore, even if the resin layer 515 and the protective layer 516 are disposed on the front surface side of the antenna 110, the reception of the radio wave is not affected.

Operation Effect of First Embodiment

According to the present embodiment, the difference in colors is substantially negligible among the region where the first non-power generating section A1 of the solar battery 50 is located, the region where the second non-power generating section A2 is located, the region where the third non-power generating section A3 is located, and the region where the solar cells 51 to 58 are located. All of the regions have substantially the same color. When the dial 11 is viewed from the front surface side, even if the solar battery 50 is viewable, the overall electronic timepiece appears uniformly the same color without any uneven color. Accordingly, the external appearance is improved, the decorative design is improved, and the electronic timepiece looks more luxurious. Furthermore, the overall textures of the dial 11 are unified when viewed from the front surface side of the dial 11.

According to the present embodiment, the resin layer 515 is colored. Accordingly, the light transmittance is lower compared to a transparent case. Therefore, in a case where the resin layer 515 has a light transmittance that is the same as that of the transparent electrode 514, the resin layer 515 can be thinned, compared to the case where the resin layer 515 is transparent.

The resin layer 515 is colored with a color close to the color of the semiconductor layer 513. Therefore, the difference in colors is substantially eliminated between the region where the first non-power generating section A1, the second non-power generating section A2, and the third non-power generating section A3 of the solar battery 50 are located and the region where the solar cells 51 to 58 are located. In this manner, the difference in colors can be substantially eliminated when the dial 11 is viewed from the front surface side. Normally, the resin is not transparent, or is not colored a milky color. The light transmittance can be adjusted using the color of the resin used without coloring the resin layer 515. In this case, the light transmittance is adjusted using the thickness of the resin layer 515.

According to the present embodiment, the absorbance index of the resin layer 515 is higher than the absorbance index of the protective layer 516. Therefore, for example, compared to a case where the absorbance index of the resin layer 515 is the same as the absorbance index of the protective layer 516, in a case where the resin layer 515 and the transparent electrode 514 are set to have the same light transmittance, the thickness of the resin layer 515 can be thinned.

According to the present embodiment, the resin layers 515 respectively disposed in the first non-power generating section A1, the second non-power generating section A2, and the third non-power generating section A3 are configured to include the same material. Accordingly, for example, in a case where the respective resin layers 515 are set to have the light transmittance the same as that of the transparent electrode 514, the respective resin layers 515 can have the same thickness. Therefore, the respective resin layers 515 can be formed all at once by means of coating, for example.

According to the present embodiment, the first non-power generating section A1 is continuous up to the outer peripheral edge of the solar battery 50 in a plan view. Therefore, for example, compared to a case where the solar cell is disposed between the first non-power generating section A1 and the outer periphery of the solar battery 50, the antenna 110 can be located closer to the exterior case 30, and the antenna 110 can be more freely located.

According to the present embodiment, the first non-power generating section A1 overlaps the antenna 110 and is an integrally incorporated into the solar battery 50. Accordingly, compared to a case of using a light shielding sheet (e.g., a separate member), the thickness of the electronic timepiece 1 can be thinned. Further, in a case of using a light shielding sheet, a distance between the dial 11 and the solar battery 50 and a distance between the dial 11 and the light shielding sheet are different from each other. Consequently, in some cases, there may be a difference in colors when viewed from the front surface side of the dial 11. In contrast, according to the present embodiment, the distances from the dial 11 can be the same as each other. Therefore, the difference in colors can be substantially eliminated when the dial 11 is viewed from the front surface side.

Second Embodiment

In the solar battery 50 according to the first embodiment, the transparent electrode 514 is not disposed in the portion overlapping the antenna 110 in a plan view. In a solar battery 50A according to a second embodiment, the transparent electrode 514 is disposed in a portion of the location overlapping with the antenna 110 in the plan view.

Figure 12:
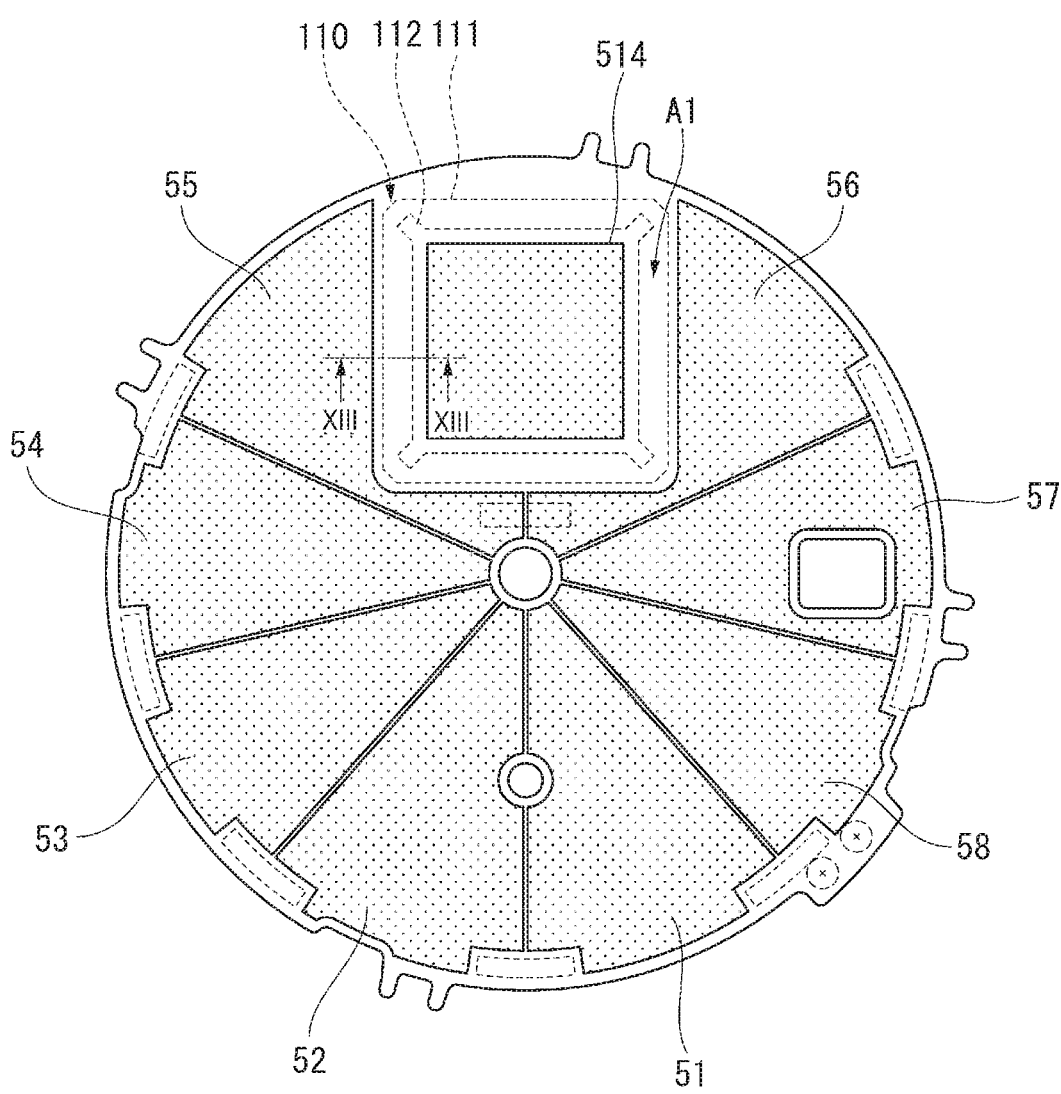
FIG. 12 is a plan view of a solar battery according to a second embodiment of the invention.
Figure 13:
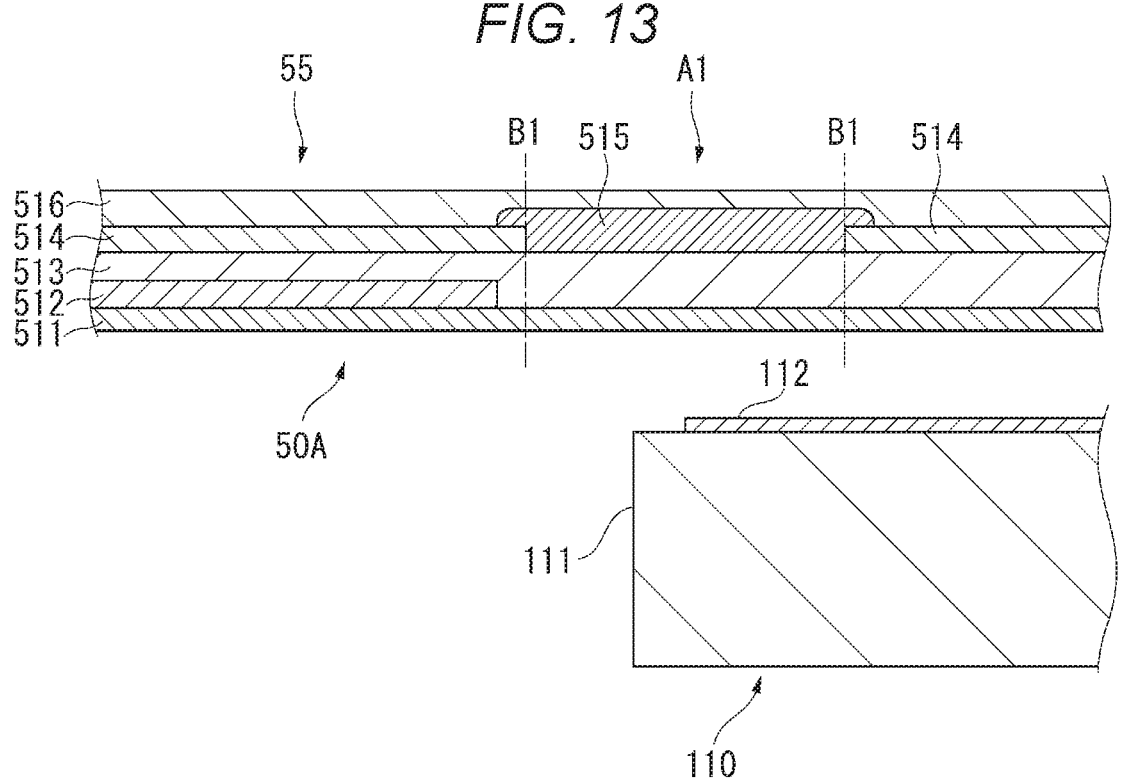
FIG. 13 is a sectional view of the solar battery and a first non-power generating section of an antenna according to the second embodiment.

FIG. 12 is a plan view of the solar battery 50A, and FIG. 13 is a sectional view taken along line XIII-XIII in FIG. 12.

In the antenna 110, currents concentrate on the outer peripheral edge of the radiation electrode 112. Accordingly, electric lines of force are generated from the outer peripheral edge of the radiation electrode 112. Therefore, even if the electrode is disposed inside the outer peripheral edge of the radiation electrode 112 in the solar cell 50A in a plan view, the receiving performance of the antenna 110 is less affected by the electrode.

Therefore, according to the present embodiment, as illustrated in FIGS. 12 and 13, the semiconductor layer 513 and the transparent electrode 514 are disposed at a position inside the outer peripheral edge of the radiation electrode 112 in the solar battery 50A in a plan view. In this manner, the difference in colors is reduced between the inside of the outer peripheral edge of the radiation electrode 112 and a position where the solar cells 51 to 58 are disposed. The annular first non-power generating section A1 is located at a position surrounding the transparent electrode 514 in a plan view.

That is, the film substrate 511, the semiconductor layer 513, the transparent electrode 514, and the protective layer 516 are stacked inside the outer peripheral edge of the radiation electrode 112 in a plan view in the solar battery 50A.

According to the present embodiment, the transparent electrode 514 disposed at the position overlapping the antenna 110 is smaller than the radiation electrode 112 so as to reliably prevent the receiving performance of the antenna 110 from being degraded by the transparent electrode 514. The outer peripheral edge of the transparent electrode 514 is separated as much as 1 mm or more in a plan view from the outer peripheral edge of the radiation electrode 112.

Operation Effect of Second Embodiment

According to the present embodiment, compared to a case where the first non-power generating section A1 completely overlaps the antenna 110 in a plan view, it is possible to reduce an area of the first non-power generating section A1. Accordingly, even if the colors are slightly different from each other between the position where the first non-power generating section A1 is located and the position where the solar cells 51 to 58 are located, this difference can be made even further inconspicuous. Therefore, the difference in colors can be substantially eliminated when the dial 11 is viewed from the front surface side.

Third Embodiment

In the solar battery 50A according to the second embodiment, the transparent electrode 514 is disposed in a portion of the location overlapping the antenna 110 in a plan view, and the metal electrode 512 is not disposed therein. In contrast, in a solar battery 50B according to a third embodiment, the metal electrode 512 in addition to the transparent electrode 514 is disposed in a portion overlapping the antenna 110 in a plan view.

Figure 14:
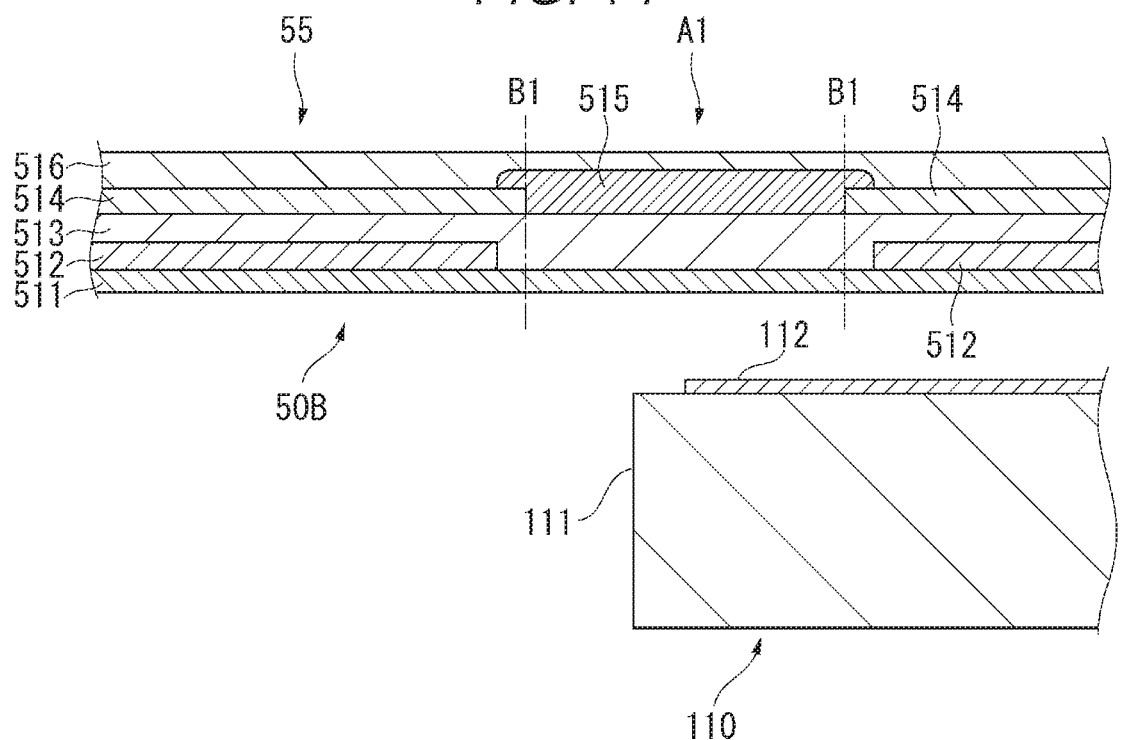
FIG. 14 is a sectional view of a solar battery and a first non-power generating section of an antenna according to a third embodiment of the invention.

FIG. 14 is a sectional view of the solar battery 50B and the antenna 110.

According to the present embodiment, as illustrated in FIG. 14, the metal electrode 512 which is smaller than the radiation electrode 112 is disposed inside the outer peripheral edge of the radiation electrode 112 in the solar battery 50B in a plan view. That is, in a plan view in the solar battery 50B, the film substrate 511, the metal electrode 512, the semiconductor layer 513, the transparent electrode 514, and the protective layer 516 are stacked inside the outer peripheral edge of the radiation electrode 112.

According to the present embodiment, in order to reliably prevent the receiving performance of the antenna 110 from being degraded by the metal electrode 512, the outer peripheral edge of the metal electrode 512 disposed at a position overlapping the antenna 110 is separated as much as 1 mm or more in a plan view from the outer peripheral edge of the radiation electrode 112.

The metal electrode 512, the semiconductor layer 513, and the transparent electrode 514 which are stacked inside the outer peripheral edge of the radiation electrode 112 are connected to the solar cells 51 to 58, thereby functioning as the solar cell for generating power.

Operation Effect of Third Embodiment

In the solar battery 50B, although the amount of the light is slight, the light reflected on the metal electrode 512 is emitted to the dial 11 side after being transmitted through the semiconductor layer 513 and the transparent electrode 514. Accordingly, the colors appear slightly different between the region having the metal electrode 512 and the region having no metal electrode 512.

According to the present embodiment, in a plan view, similar to the solar cells 51 to 58, the metal electrode 512, the semiconductor layer 513, and the transparent electrode 514 are disposed inside the outer peripheral edge of the radiation electrode 112 in the solar battery 50B. In this manner, the same color can be provided for the region inside the outer peripheral edge of the radiation electrode 112 of the solar battery 50B and the region where the solar cells 51 to 58 are located. Therefore, for example, even in a case where the light transmittance of the dial 11 is high, the difference in colors can be substantially eliminated when the dial 11 is viewed from the front surface side, and the external appearance can be effectively improved.

Evaluation Results

Table 1 below represents evaluation results of signal levels of the radio waves received by the antenna 110 in Comparative Examples 1 to 3 and the first to third embodiments. The result of "Present" or "Absent" in Table represents whether the metal electrode 512, the semiconductor layer 513, the resin layer 515, and the transparent electrode 514 are present or absent at the position overlapping the antenna 110 in a plan view in the solar battery.

110 in a plan view in the solar battery, compared to a case (Comparative Example 1) where the metal electrode 512, the semiconductor layer 513, the resin layer 515, and the transparent electrode 514 are absent.

Other Embodiments

The invention is not limited to the embodiments described above, and modifications and improvements within the scope of achieving the aspects of the invention are included in the invention.

Modification Example 1

According to the above-described respective embodiments, the semiconductor layer 513 and the resin layer 515 are disposed in the first non-power generating section A1 and the third non-power generating section A3. However, the invention is not limited thereto.

For example, in the first non-power generating section A1 and the third non-power generating section A3, when the dial 11 is viewed from the front surface side, in a case where there is an invisible portion since the portion overlaps the dial ring 35, the semiconductor layer 513 and the resin layer 515 may not be disposed in the portion.

Modification Example 2

According to the above-described respective embodiments, the semiconductor layer 513 and the resin layer 515 are disposed in the second non-power generating section A2 which is the cell division section. However, the invention is not limited thereto.

In the second non-power generating section A2, in a case of the second non-power generating section A2 where a dimension (width) along a facing direction of the adjacent solar cells is equal to or smaller than a predetermined dimension (for example, 200 μm), the difference in colors is inconspicuous even if the color of the region where the second power generating section A2 is located is different from the color of the region where the solar cells 51 to 58 are located.

Figure 15:
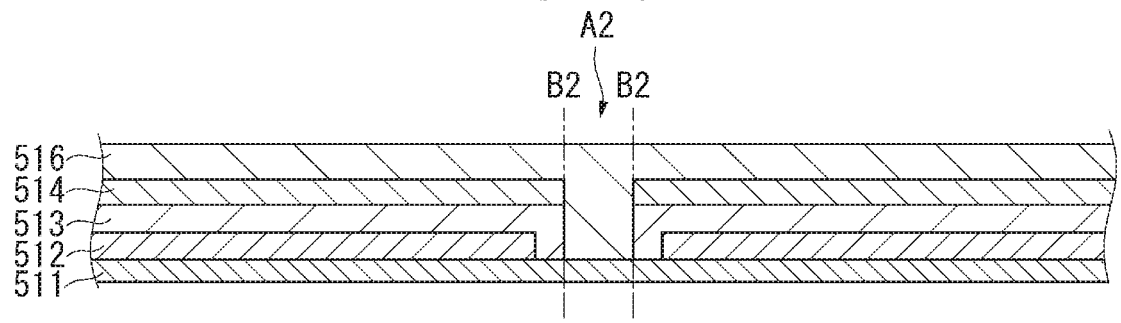
FIG. 15 is a sectional view of a second non-power generating section of a solar battery according to Modification Example 2 of the invention.

Therefore, in the second non-power generating section A2, the portion where the dimension along the facing direction is equal to or smaller than the predetermined dimension may be configured so that the semiconductor layer 513 and the resin layer 515 are not disposed as illustrated in FIG. 15. That is, a configuration may be

TABLE 1

|  | Comparative Example 1 | Comparative Example 2 | Comparative Example 3 | First Embodiment | Second Embodiment | Third Embodiment |
| --- | --- | --- | --- | --- | --- | --- |
| Transparent Electrode | Absent | Present | Absent | Absent | Partially Present | Partially Present |
| Resin Layer | Absent | Absent | Absent | Present | Partially Present | Partially Present |
| Semiconductor Layer (800 nm) | Absent | Present | Present | Present | Present | Present |
| Metal Electrode | Absent | Present | Absent | Absent | Absent | Partially Present |
| Signal Level (S/N) | 48 | 23 | 48 | 48 | 46 | 45 |

As illustrated in Table 1, according to the first embodiment to the third embodiment, substantially the same signal level can be obtained at the position overlapping the antenna adopted which includes the film substrate 511 and the protective layer 516. In this case, the semiconductor layer 513 is removed by means of laser processing, for example.

Here, in the second non-power generating section A2, the dimension along the facing direction means a distance of B2-B2 in FIG. 15.

According to this configuration, the semiconductor layer 513 is not disposed in the second non-power generating section A2. Accordingly, interference can be suppressed between the solar cells 51 to 58, and an interval can be further narrowed among the solar cells 51 to 58. In this manner, an area of the respective solar cells 51 to 58 can be widened, and power generation capacity of the solar battery can be improved.

The film substrate 511 may be colored so that a difference between the color of the second non-power generating section A2 and the color of the solar cells 51 to 58 is further inconspicuous. It is more desirable that the second non-power generating section A2 is colored so as to have the color the same as the color of the semiconductor layer 513.

Modification Example 3

According to the above-described respective embodiments, the protective layer 516 is disposed on the dial 11 side of the resin layer 515. However, the invention is not limited thereto.

Figure 16:
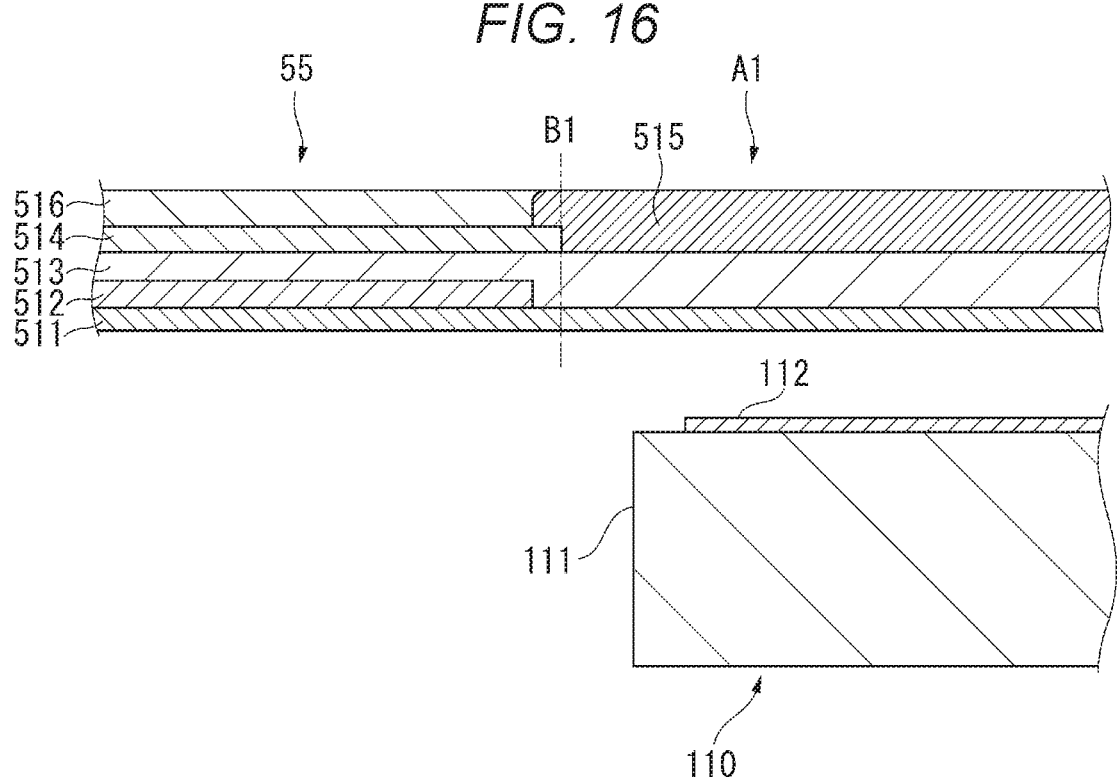
FIG. 16 is a sectional view of a solar battery and a first non-power generating section of an antenna according to Modification Example 3 of the invention.

For example, as illustrated in FIG. 16, a configuration may be adopted so that the protective layer 516 is not disposed on the dial 11 side of the resin layer 515.

According to this configuration, compared to a configuration in which the protective layer 516 is disposed on the dial 11 side of the resin layer 515, the thickness of the first non-power generating section A1, the second non-power generating section A2, and the third non-power generating section A3 can be thinned.

Modification Example 4

According to the above-described respective embodiments, the solar batteries 50, 50A, and 50B include the solar cells 55 and 56 without fan shapes in a plan view. However, the invention is not limited thereto.

Figure 17:
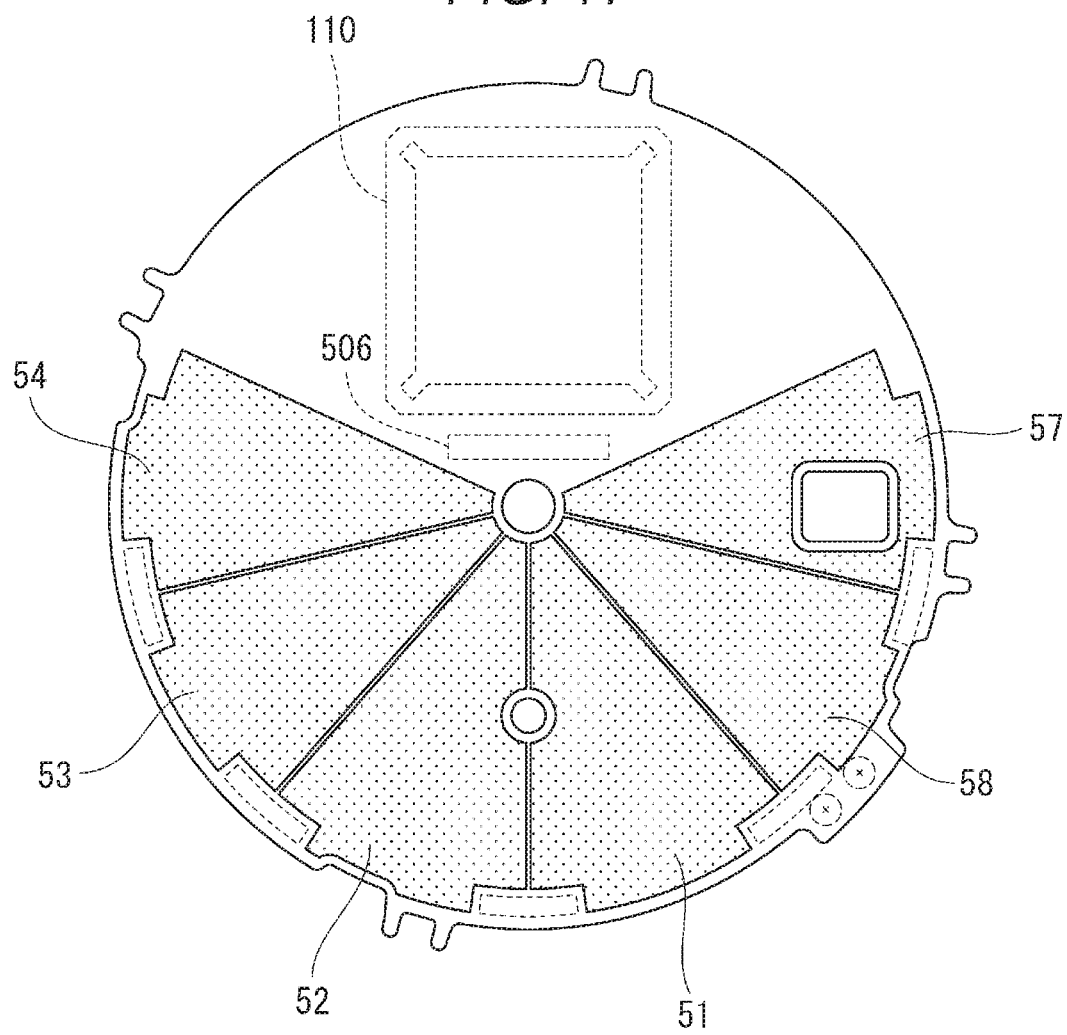
FIG. 17 is a plan view of a solar battery according to Modification Example 4 of the invention.

For example, as illustrated in FIG. 17, the solar battery may be configured to include only the solar cells 51 to 54, 57, and 58 having substantially fan shapes in a plan view.

According to this configuration, the respective solar cells included in the solar battery can be easily designed so as to have the same area. In a case where the metal electrode 512 or the transparent electrode 514 corresponding to the respective solar cells is patterned by means of laser processing, it is possible to minimize the length to be cut by the laser as much as possible. Accordingly, it is possible to shorten the manufacturing process. Compared to the respective embodiments, a distance can increase between the solar cells adjacent to the antenna 110 and the antenna 110 in a plan view. Therefore, the receiving performance can be further improved.

As in a case of Modification Example 3 described above, in a case where the protective layer 516 is disposed in the solar cell only, the following effect can be obtained. That is, when the protective layer 516 is formed by coating a material, compared to a case where many bent portions or many curved portions are present in the outer peripheral edge of the solar cell, the material is less likely to be uneven, and the material is less likely to protrude outward of the solar cell. Therefore, the protective layer 516 is easily formed.

According to Modification Example 4, an overall area of the solar cell becomes smaller than that of the respective embodiments. However, the light transmittance of the dial 11 is improved. Therefore, power generation capacity of the solar battery can be maintained.

Modification Example 5

Figure 18:
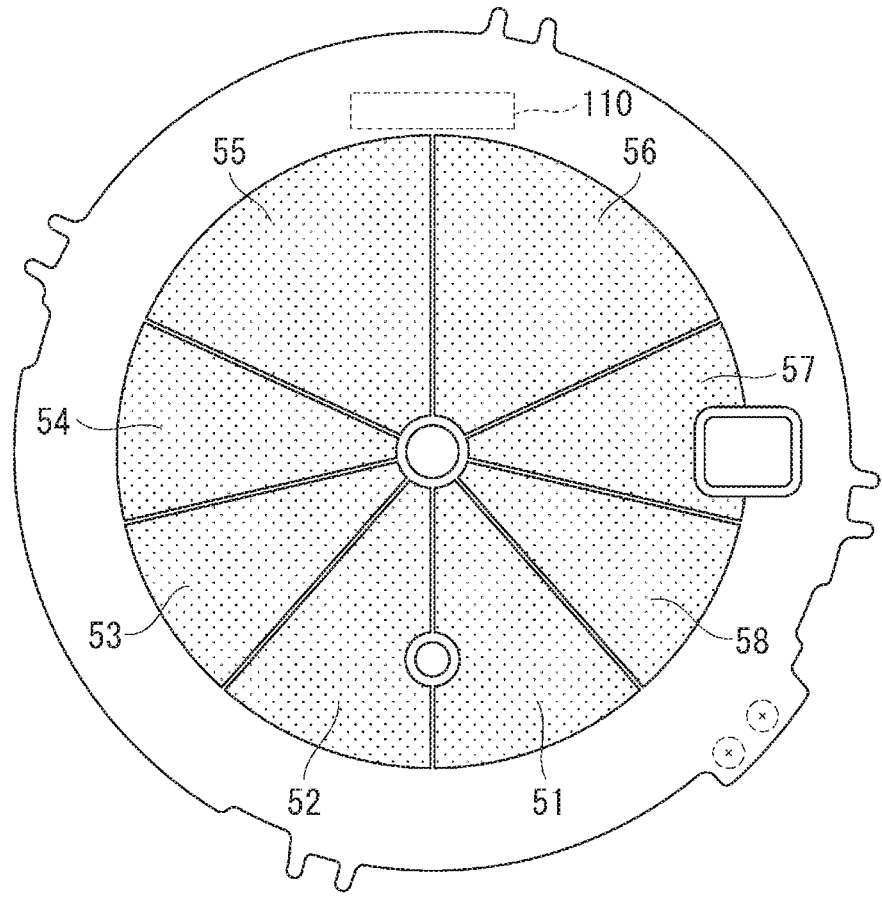
FIG. 18 is a plan view of a solar battery according to Modification Example 5 of the invention.

In a case where the size of the antenna 110 can be reduced, as illustrated in FIG. 18, the solar cells 51 to 58 have a substantially fan shape in a plan view, and are located with a predetermined distance therebetween from the outer peripheral edge of the solar battery. The antenna 110 may be located between the outer peripheral edge of the solar cells 51 to 58 and the outer peripheral edge of the solar battery in a plan view. The solar cells 51 to 58 may be separated from the plane center of the solar battery in a plan view so that the antenna 110 is located between the plane center and the solar cells 51 to 58.

Modification Example 6

Figure 19:
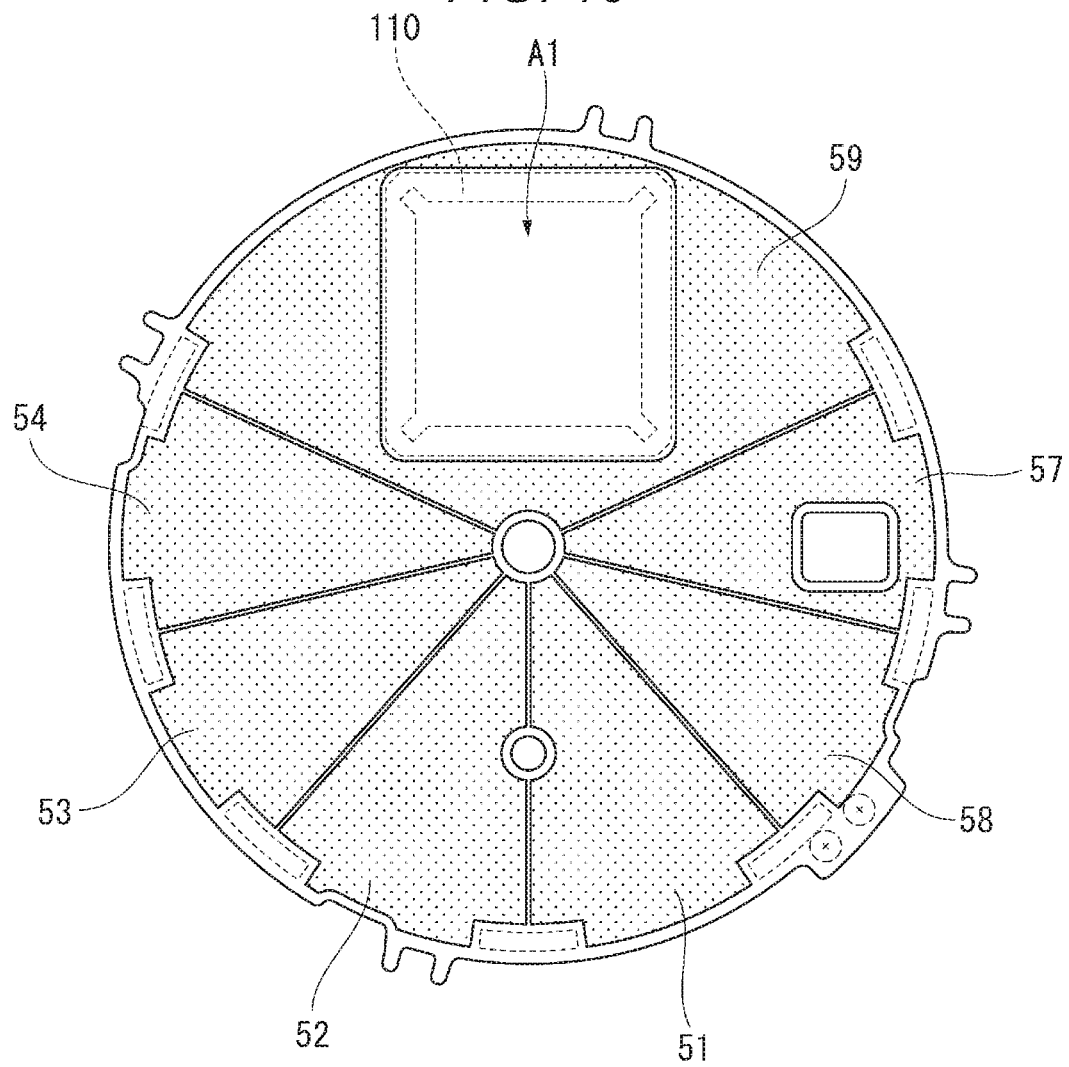
FIG. 19 is a plan view of a solar battery according to Modification Example 6 of the invention.

As illustrated in FIG. 19, instead of the solar cells 55 and 56, in a plan view, one solar cell 59 may be disposed which has a shape surrounded by two lines surrounding the outer peripheral edge of the antenna 110 and extending radially from the plane center of the solar battery and a line extending along the outer peripheral edge of the solar battery. In this case, in a plan view, the first non-power generating section A1 is surrounded by the solar cell 59.

According to this configuration, the region on the outer peripheral side of the antenna 110 in the solar battery can function as the solar cell in a plan view. Accordingly, an area of the solar cell can be increased, and power generation capacity can be improved.

Modification Example 7

Figure 20:
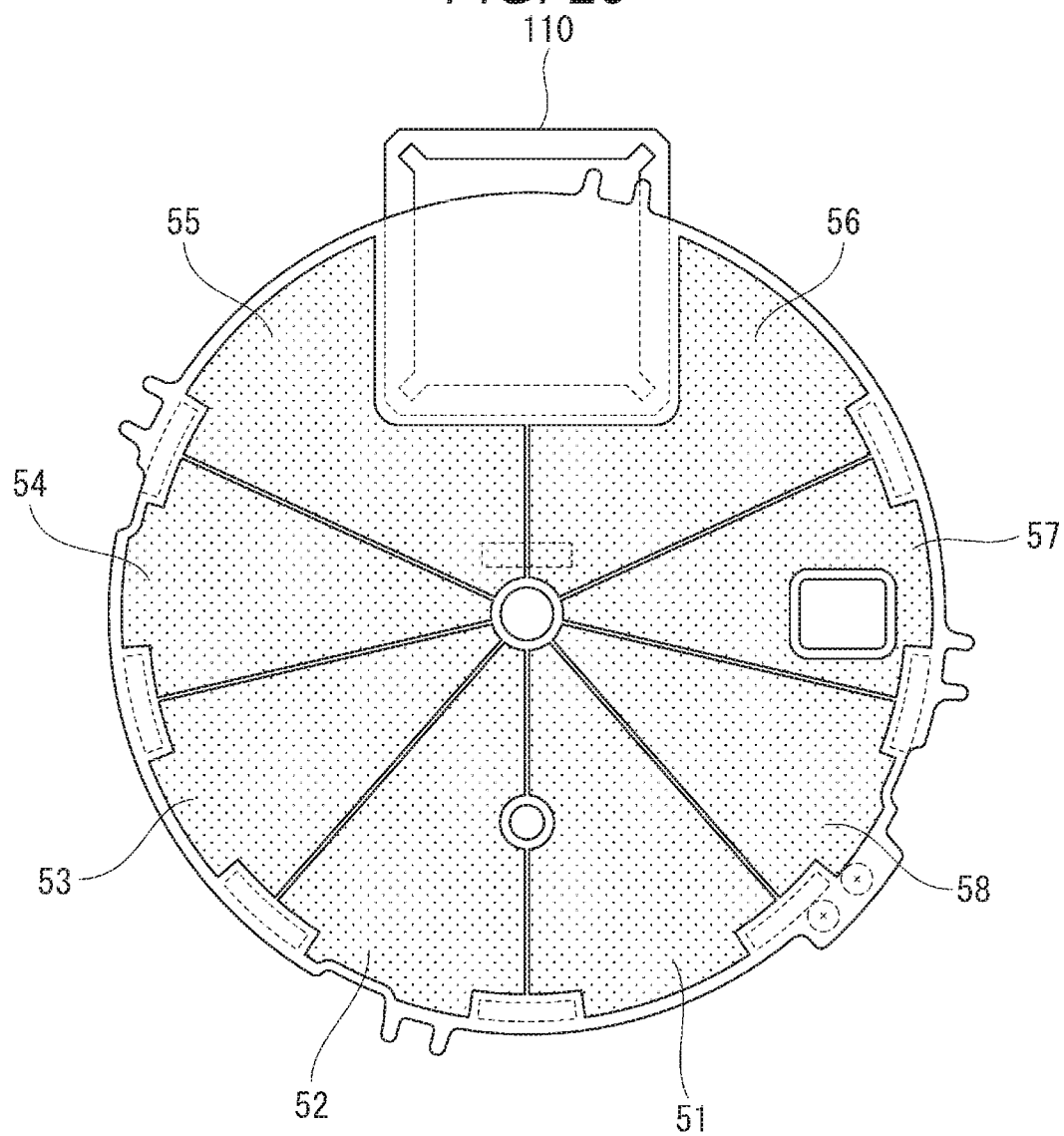
FIG. 20 is a plan view of a solar battery according to Modification Example 7 of the invention.

According to the above-described respective embodiments, the solar batteries 50, 50A, and 50B overlap the antenna 110 in a plan view. However, the invention is not limited thereto. For example, as illustrated in FIG. 20, in a plan view, a portion of the antenna 110 may be located outside the solar batteries 50, 50A, and 50B.

Modification Example 8

Figure 21:
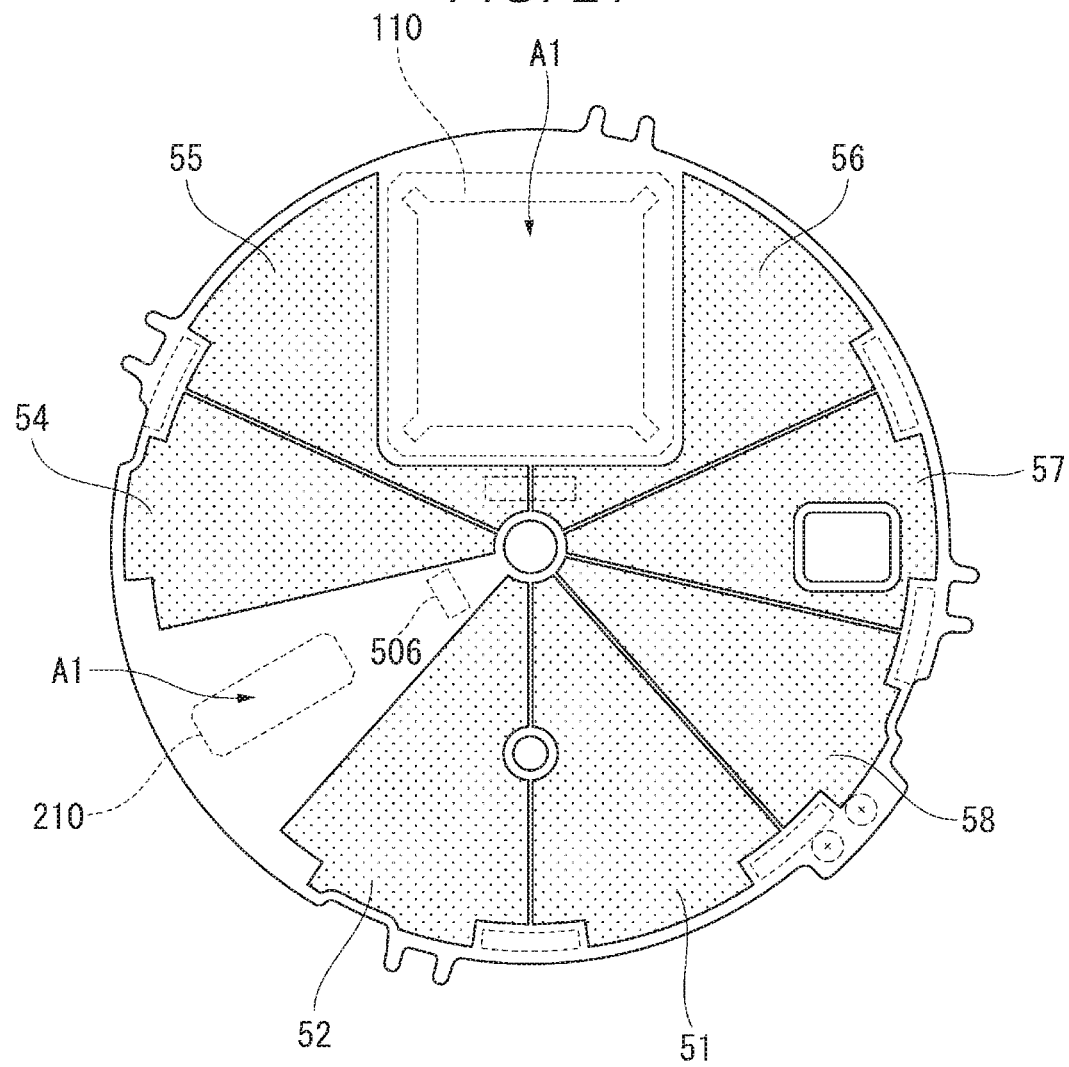
FIG. 21 is a plan view of a solar battery according to Modification Example 8 of the invention.

In addition to the antenna 110 for receiving the satellite signal, the electronic timepiece 1 may include an antenna 210 for receiving other radio waves such as Bluetooth (registered trademark), Bluetooth Low Energy (BLE), Wi-Fi (registered trademark), Near Field Communication (NFC), Low Power, Wide Area (LPWA), and standard radio waves. In this case, for example, in the solar battery, as illustrated in FIG. 21, the solar cell is not disposed at a position overlapping the antenna 210 in a plan view, and the position is also set as the first non-power generating section A1.

Modification Example 9

Figure 22:
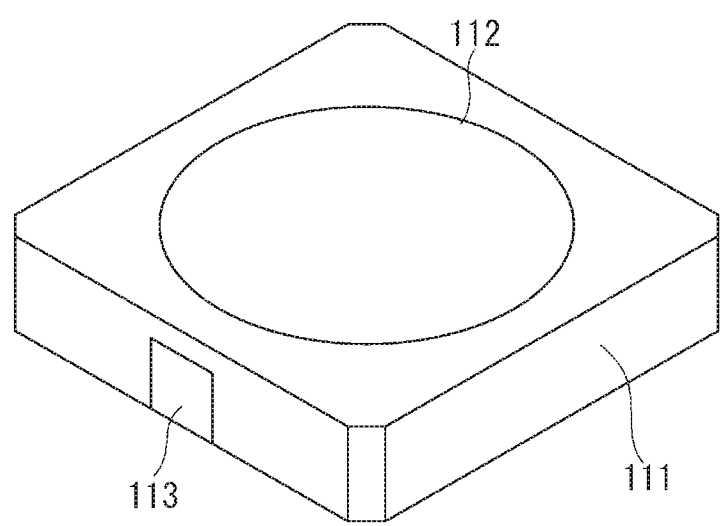
FIG. 22 is a perspective view of an antenna according to Modification Example 9 of the invention.

According to the above-described respective embodiments, the radiation electrode 112 of the antenna 110 is formed in a substantially square shape in a plan view. However, the invention is not limited thereto. For example, as illustrated in FIG. 22, the radiation electrode 112 may be formed in a substantially circular shape in a plan view. In this case, it becomes easier to receive the circularly polarized wave.

Modification Example 10

Figure 23:
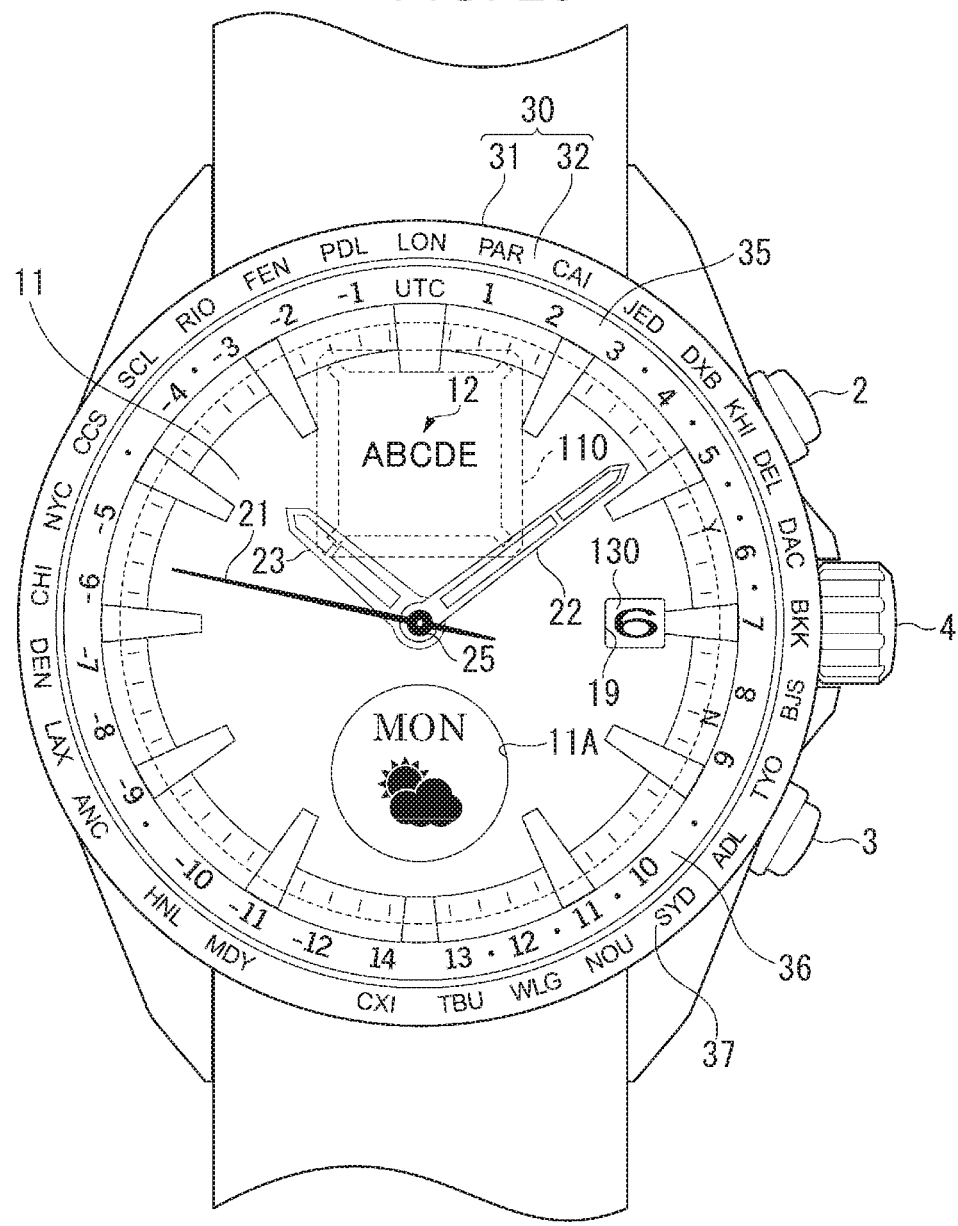
FIG. 23 is a plan view of an electronic timepiece according to Modification Example 10 of the invention.

According to the above-described respective embodiments, in the electronic timepiece, the indicating hand 24 is disposed at a position shifted in the direction of 6 O'clock from the plane center of the dial 11. However, instead of the indicating hand 24, for example, as illustrated in FIG. 23, a configuration may be adopted as follows. An opening portion 11A is disposed in the dial 11 so as to visually recognize a digital display portion such as a liquid crystal display, an electrophoretic display (EPD), and an organic electro luminescence (EL) display through the opening portion 11A. For example, this digital display portion indicates the day of the week or the weather.

Figure 24:
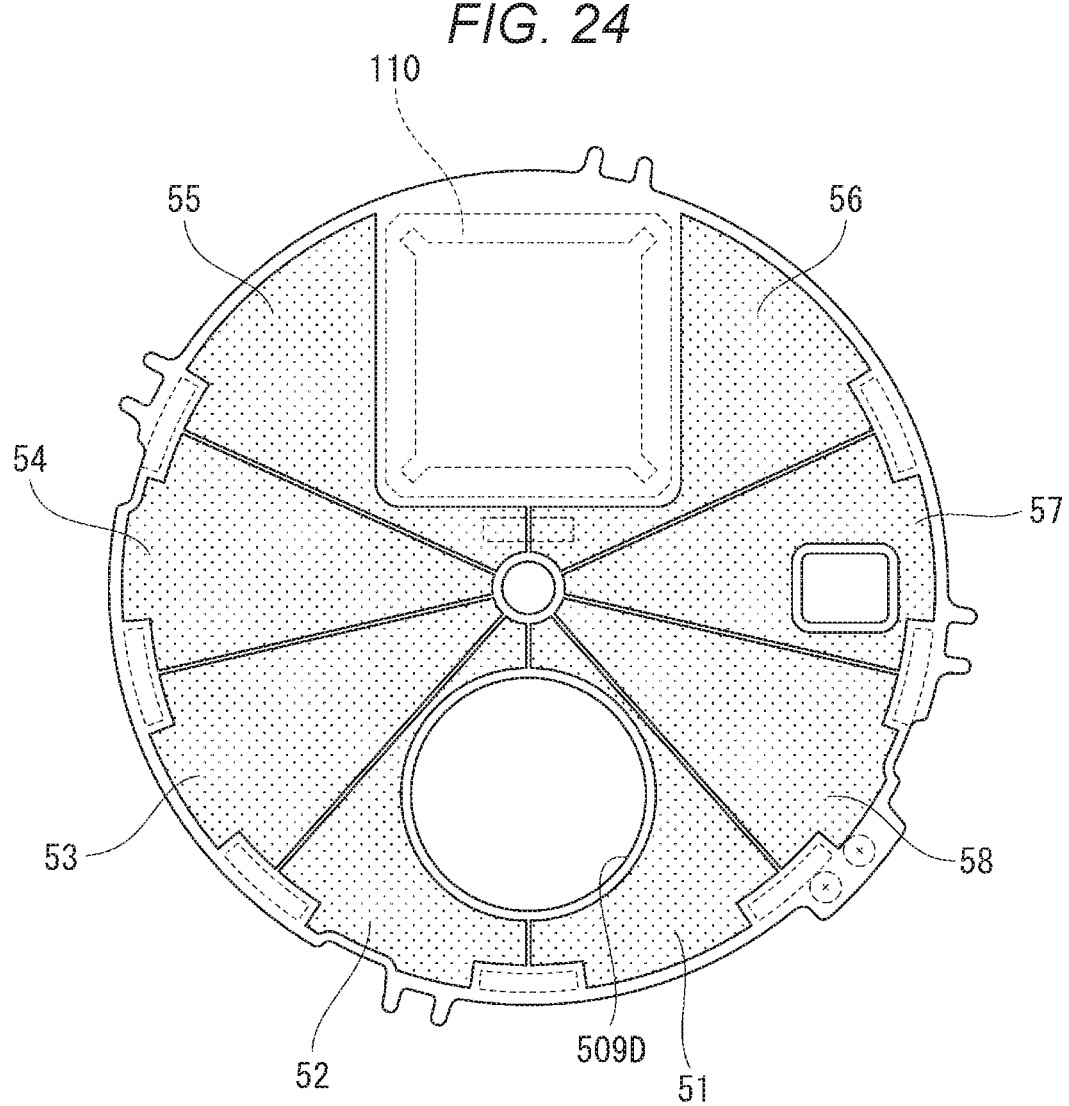
FIG. 24 is a plan view of a solar battery according to Modification Example 10 of the invention.

In this case, as illustrated in FIG. 24, the solar battery is provided with an opening portion 509D at a position overlapping with the digital display portion in a plan view.

Modification Example 11

According to the above-described respective embodiments, in the second non-power generating section A2 and the third non-power generating section A3, the resin layer 515 is disposed on the front surface side of the semiconductor layer 513. However, the invention is not limited thereto.

For example, even if the colors are different from each other in the region where the second non-power generating section A2 and the third non-power generating section A3 are located and the region where the solar cells to 58 are located, in a case where the difference in colors is less likely to conspicuous, the resin layer 515 may not be disposed on the front surface side of the semiconductor layer 513 in the second non-power generating section A2 and the third non-power generating section A3. However, it is preferable to substantially eliminate the difference in colors for the portion having the resin layer 515.

Modification Example 12

According to the above-described respective embodiments, the respective resin layers 515 disposed in the first non-power generating section A1, the second non-power generating section A2, and the third non-power generating section A3 are formed of the same material. However, the invention is not limited thereto. For example, the respective resin layers 515 may be formed of mutually different materials.

Modification Example 13

According to the above-described respective embodiments, the third non-power generating section A3 is located in the solar batteries 50, 50A, and 50B. However, the invention is not limited thereto. For example, the third non-power generating section A3 may not be provided. That is, the solar cells 51 to 58 may be continuously disposed up to the outer peripheral edge of the solar battery.

Modification Example 14

According to the above-described respective embodiments, the antenna 110 is provided with the patch antenna for receiving the satellite signal. However, the invention is not limited thereto. For example, an inverted-F antenna or a chip antenna may be used. The antenna 110 may be an antenna for receiving other radio waves such as Bluetooth (registered trademark), BLE, Wi-Fi (registered trademark), NFC, LPWA, and standard radio waves. In this case, for example, the semiconductor layer 513 may be set to have the thickness or the resistivity which does not impede the radio wave.

However, the patch antenna is bigger than a bar antenna, for example. If the electrode is disposed in the solar batteries 50, 50A, and 50B, a portion where the receiving performance of the antenna 110 is degraded increases in a wide range. That is, the first non-power generating section A1 needs to be disposed in the wide range. Therefore, the difference in colors is substantially eliminated between the region where the first non-power generating section A1 is located and the region where the solar cells 51 to 58 are located. In this manner, the external appearance can be effectively improved when the dial 11 is viewed from the front surface side.

According to the first embodiment, the first non-power generating section A1 overlaps the antenna 110 in a plan view. Accordingly, the radio wave incident from the dial 11 side of the antenna 110 is not blocked by the electrodes of the solar cells 51 to 58. Therefore, for example, regardless of a type of the antenna 110 such as the patch antenna and the bar antenna, the receiving performance of the antenna 110 can be improved, compared to a case where the radio wave is blocked by the electrodes of the solar cells 51 to 58.

Modification Example 15

According to the above-described respective embodiments, in the first non-power generating section A1, the protective layer 516 is disposed on the dial 11 side of the resin layer 515. However, the invention is not limited thereto.

Figure 25:
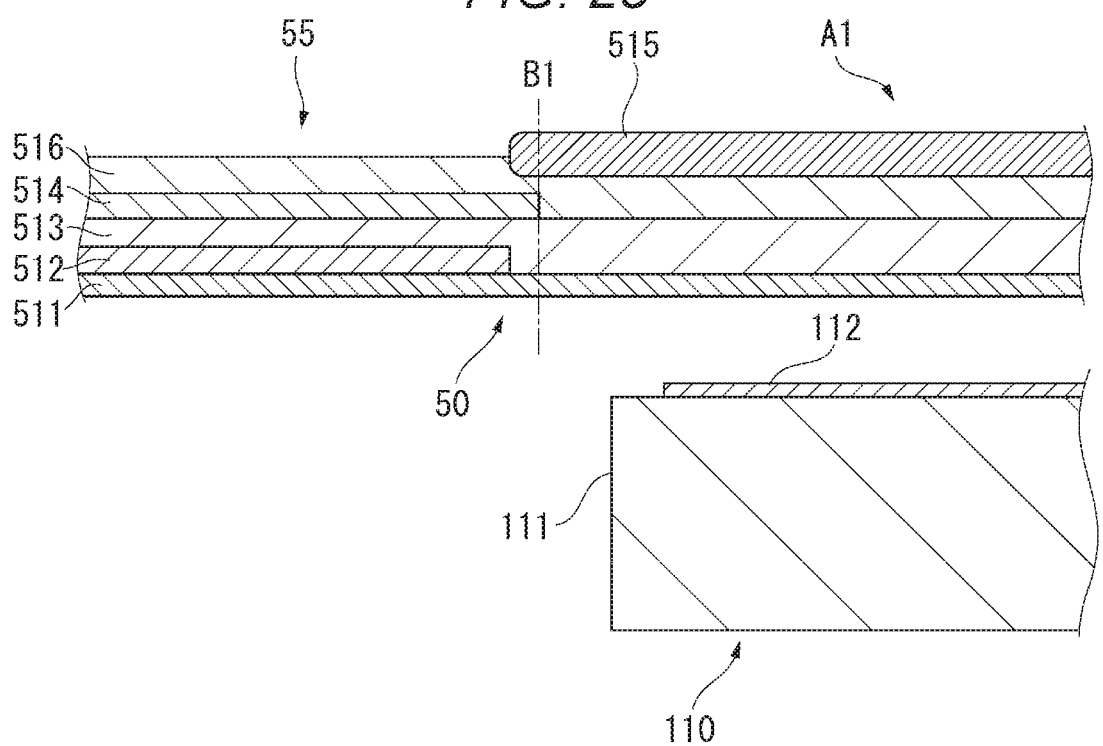
FIG. 25 is a sectional view of a solar battery and a first non-power generating section of an antenna according to Modification Example 15 of the invention.

For example, as illustrated in FIG. 25, in the first non-power generating section A1, a configuration may be adopted so that the resin layer 515 is disposed on the dial 11 side of the protective layer 516.

According to this configuration, the light transmittance can be adjusted by changing the thickness of the resin layer 515. Therefore, the thickness of the resin layer 515 is adjusted, thereby enabling a difference to be reduced between the amount of the light reflected on the semiconductor layer 513 in the first non-power generating section A1 and emitted to the dial 11 side and the amount of the light reflected on the semiconductor layer 513 in the solar cells 51 to 58, transmitted through the transparent electrode 514 and the protective layer 516, and emitted to the dial 11 side. In this case, the resin layer 515 is located closest to the dial 11 side. Accordingly, the thickness is likely to be adjusted. Therefore, the difference in colors can be eliminated between the region where the first non-power generating section A1 of the solar battery is located and the region where the solar cells 51 to 58 are located. Accordingly, the external appearance can be improved.

Modification Example 16

According to the above-described respective embodiments, the protective layer 516 is formed by being coated with the non-conductive resin having excellent strength. However, the invention is not limited thereto. For example, the protective layer 516 may be formed in such a way that a resin film formed of a polyethylene resin, an acrylic resin, or a polyester resin adheres to the protective layer 516.

Modification Example 17

Figure 26:
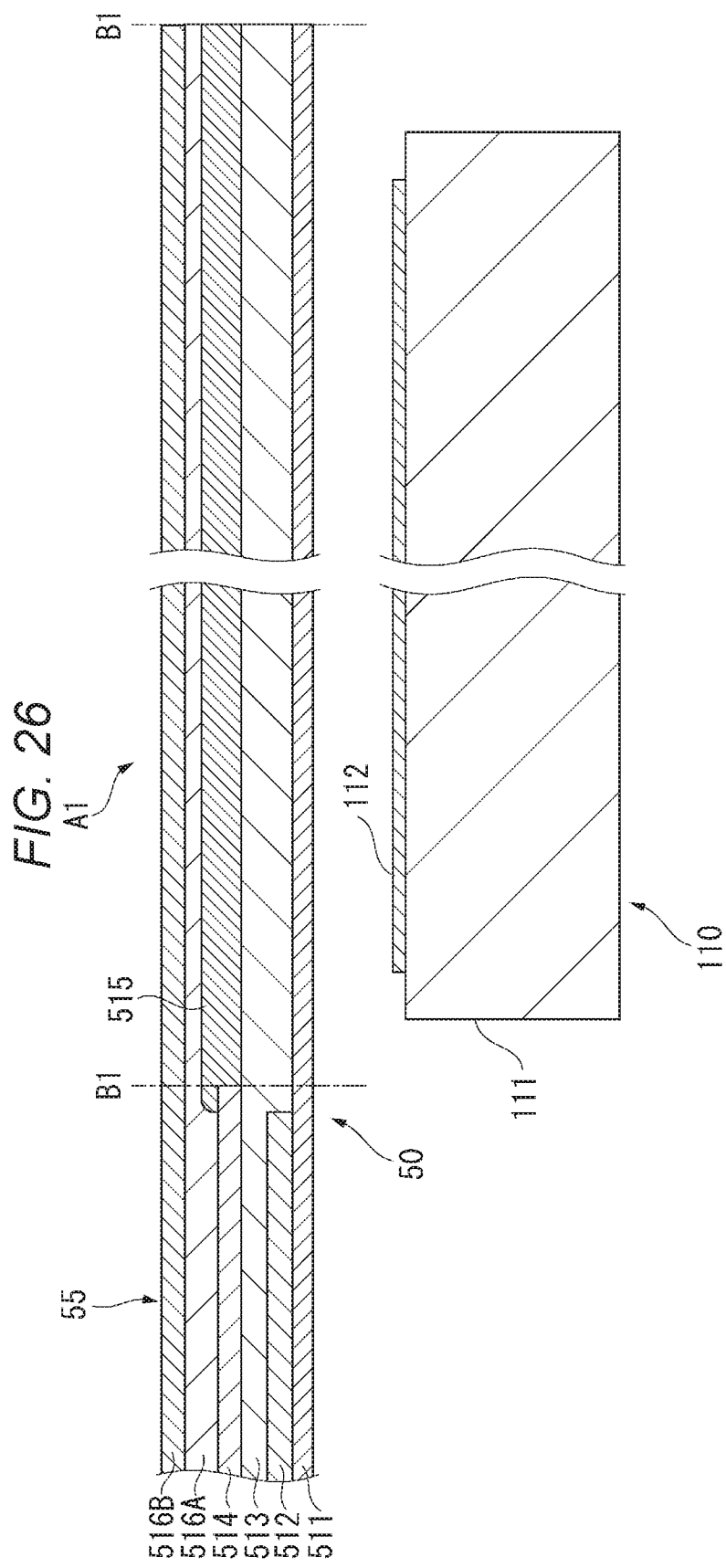
FIG. 26 is a sectional view of a solar battery and a first non-power generating section of an antenna according to Modification Example 17 of the invention.

As illustrated in FIG. 26, the protective layer 516 may be formed by stacking a protective layer 516A formed of a resin and a protective layer 516B formed of a resin film on each other. That is, the protective layer 516 may have a plurality of stacked layers.

According to this configuration, a step difference between the transparent electrode 514 and the resin layer 515 can be eliminated by the protective layer 516A formed of the resin. Thereafter, the dial 11 side can be covered with the protective layer 516B formed of the resin film which is more uniform. Therefore, it is possible to unify the textures when the solar battery 50 is viewed through the dial 11 from the front surface side of the dial 11. Therefore, the external appearance can be more effectively improved.

Modification Example 18

According to the above-described respective embodiments, in a planar view, the solar battery 50, 50A, and 50B include the solar cells 55 and 56 which do not a fan shape. However, the invention is not limited thereto.

Figure 27:
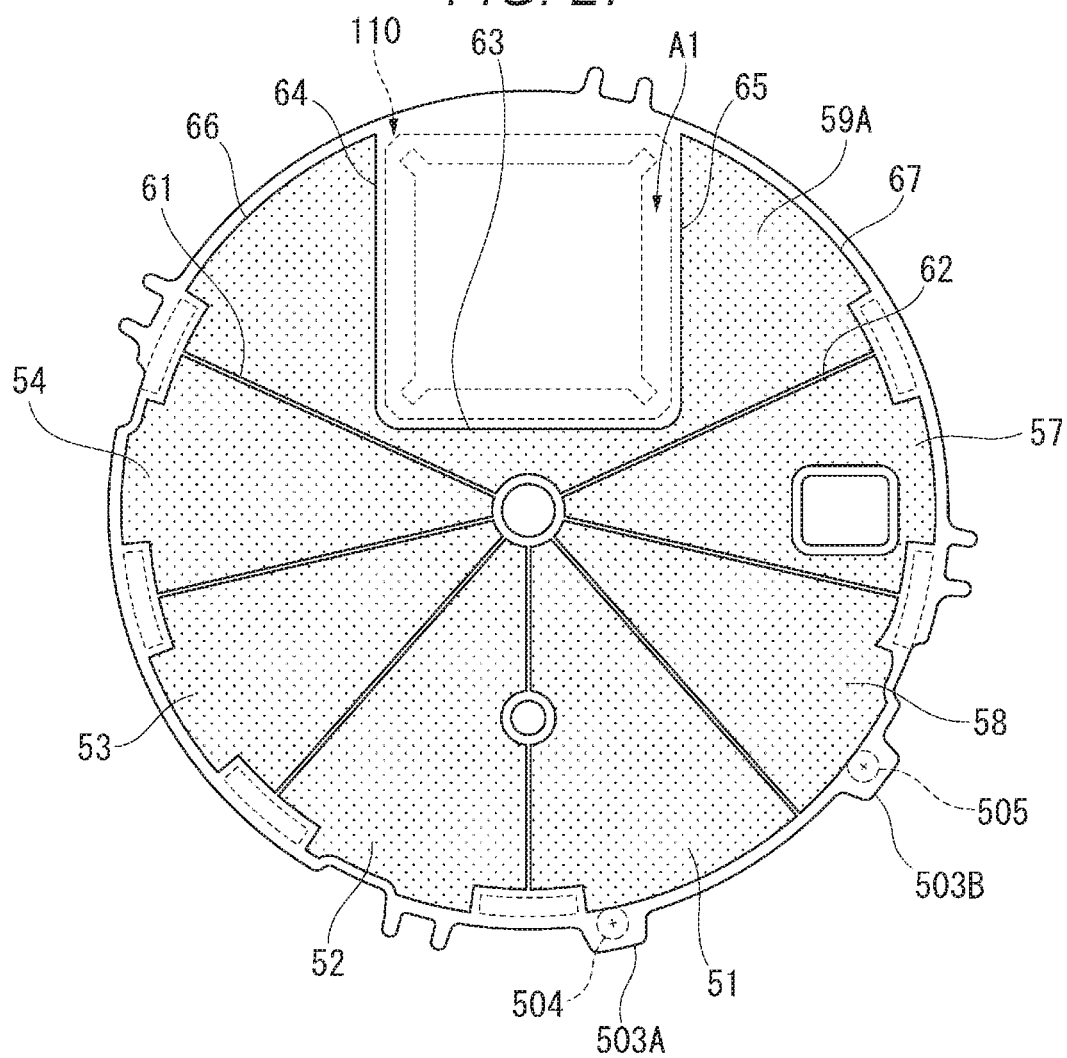
FIG. 27 is a plan view of a solar battery according to Modification Example 18 of the invention.

For example, as illustrated in FIG. 27, instead of the solar cells 55 and 56, a solar cell 59A having the following shape in a plan view may be provided. The shape is surrounded by a first line (or edge) 61 and a second line 62 which radially extend from the plane center of the solar battery, a third line 63 located closest to the plane center of the solar battery in a line extending along the outer peripheral edge of the antenna 110, a fourth line 64 intersecting the third line 63 and located on the first line side, a fifth line 65 located on the opposite side across the fourth line 64 and the antenna 110, and a sixth line 66 extending along the outer peripheral edge of the solar battery and connecting the first line 61 and the fourth line 64 to each other, and a seventh line 67 connecting the second line 62 and the fifth line 65 to each other. In this case, the solar cell adjacent to the first non-power generating section A1 is configured to include one solar cell 59A. That is, the first non-power generating section A1 is in contact with the solar cell 59A only.

According to this configuration, the connection portion 506 for connecting the solar cells 55 and 56 to each other is unnecessary. Therefore, when the solar battery 50 is viewed through the dial 11 from the front surface side of the dial 11, the connection portion 506 is transparently visible. Therefore, it is possible to prevent the external appearance from being poor.

Modification Example 19

According to the above-described respective embodiments, the connection terminals 504 and 505 are disposed in one protruding portion 503. However, the invention is not limited thereto. For example, as illustrated in FIG. 27, protruding portions 503A and 503B protruding outward of the solar cells 51 and 58 adjacent to each other may be disposed apart from each other. The connection terminal 504 may be disposed in the protruding portion 503A, and the connection terminal 505 may be disposed in the protruding portion 503B. Furthermore, without being limited to a configuration in which the connection terminals 504 and 505 are disposed in the protruding portion, for example, the connection terminals 504 and 505 may be disposed at a position overlapping the solar cell in a plan view, that is, on a rear side of the solar cell.

The entire disclosures of Japanese Patent Application Nos. 2017-185479 filed Sep. 26, 2017 and 2018-124106 filed Jun. 29, 2018 are expressly incorporated herein by reference.

What is claimed is:

1. An electronic timepiece comprising:
   an optically transparent dial;
   a solar battery disposed on a rear surface side of the dial; and
   an antenna disposed on a rear surface side of the solar battery so as to receive a radio wave,
   wherein the solar battery includes:
      one or more solar cells for generating power; and
      a first non-power generating section which transmits the radio wave to the antenna,
   wherein each of the one or more solar cells includes a metal electrode, a semiconductor layer stacked on a dial side of the metal electrode, and a transparent electrode stacked on a dial side of the semiconductor layer,
   wherein the metal electrode and the transparent electrode are excluded from the first non-power generating section, and the semiconductor layer is included within at least a portion of the first non-power generating section, and
   wherein the solar battery further includes a non-conductive member which regulates light transmittance on the dial side of the semiconductor layer in the first non-power generating section.

2. The electronic timepiece according to claim 1,
   wherein the solar battery includes a plurality of the solar cells,
   wherein the solar battery includes a second non-power generating section located between an adjacent pair of the solar cells, the second non-power generating section being a cell division section,
   wherein the metal electrode and the transparent electrode are excluded from the second non-power generating section, and
   wherein the semiconductor layer is included within at least a portion of the second non-power generating section.

3. The electronic timepiece according to claim 2,
   wherein a second non-conductive member which regulates light transmittance is disposed on the dial side of the semiconductor layer in the second non-power generating section.

4. The electronic timepiece according to claim 3,
   wherein the non-conductive member disposed in the first non-power generating section and the second non-conductive member disposed in the second non-power generating section are formed of the same material.

5. The electronic timepiece according to claim 1,
   wherein the solar battery includes a plurality of the solar cells,
   wherein the solar battery includes a second non-power generating section located between an adjacent pair of the solar cells, the second non-power generating section being a cell division section,
   wherein the metal electrode and the transparent electrode are excluded from the second non-power generating section, and
   wherein the semiconductor layer is excluded from the second non-power generating section, the second non-power generating section having a width between an adjacent pair of solar cells that is equal to or smaller than a predetermined dimension.

6. The electronic timepiece according to claim 1,
   wherein the one or more solar cells is disposed radially inward from an outer peripheral edge of the solar battery, wherein the solar battery includes another non-power generating section located between a periphery of the one or more solar cells and the outer peripheral edge, and wherein the metal electrode and the transparent electrode are excluded from the another non-power generating section, and the semiconductor layer is located within at least a portion of the another non-power generating section.

7. The electronic timepiece according to claim 6,
wherein another non-conductive member which regulates light transmittance is disposed on the dial side of the semiconductor layer in the another non-power generating section.

8. The electronic timepiece according to claim 7,
wherein the non-conductive member disposed in the first non-power generating section and the another non-conductive member disposed in the another non-power generating section are formed of the same material.

9. The electronic timepiece according to claim 1,
wherein the first non-power generating section overlaps the antenna in a plan view.

10. The electronic timepiece according to claim 1,
wherein the antenna is a patch antenna.

11. The electronic timepiece according to claim 1,
wherein the antenna is a patch antenna including a radiation electrode,
wherein the semiconductor layer and a discrete part of the transparent electrode are disposed inward of an outer peripheral edge of the radiation electrode in a plan view, and
the first non-power generating section surrounds the discrete part of the transparent electrode in the plan view.

12. The electronic timepiece according to claim 11,
wherein a discrete part of the metal electrode is disposed inward of the outer peripheral edge of the radiation electrode in the plan view.

13. The electronic timepiece according to claim 1,
wherein the first non-power generating section continuously extends to an outer peripheral edge of the solar battery in a plan view, and
the first non-power generating section overlapping the antenna in the plan view.

14. The electronic timepiece according to claim 1,
wherein an outer peripheral edge of the antenna is surrounded by the solar cell in a plan view.

15. The electronic timepiece according to claim 1,
wherein the solar battery includes a plurality of the solar cells,
wherein, in a plan view, the solar cells respectively have a shape surrounded by two edges radially extending from a plane center of the solar battery and an edge extending along an outer peripheral edge of the solar battery, and
wherein, in the plan view, the antenna is not overlapped by any part of any of the solar cells.

16. The electronic timepiece according to claim 1,
wherein the solar battery includes a plurality of the solar cells, and
wherein, in a plan view, the first non-power generating section is in contact with only one of the solar cells.

17. An electronic timepiece comprising:
an optically transparent dial;
a solar battery disposed on a rear surface side of the dial; and
an antenna disposed on a rear surface side of the solar battery so as to receive a radio wave,
wherein the solar battery includes:
one or more solar cells for generating power; and
a first non-power generating section which transmits the radio wave to the antenna,
wherein each of the one or more solar cells includes a metal electrode, a semiconductor layer stacked on a dial side of the metal electrode, and a transparent electrode stacked on a dial side of the semiconductor layer,
wherein the metal electrode and the transparent electrode are excluded from the first non-power generating section, and the semiconductor layer is included within at least a portion of the first non-power generating section, and
wherein the solar battery further includes a colored non-conductive member on the dial side of the semiconductor layer in the first non-power generating section.

18. An electronic timepiece comprising:
an optically transparent dial;
a solar battery disposed on a rear surface side of the dial; and
an antenna disposed on a rear surface side of the solar battery so as to receive a radio wave,
wherein the solar battery includes:
one or more solar cells for generating power; and
a first non-power generating section which transmits the radio wave to the antenna,
wherein the solar cell includes a metal electrode, a semiconductor layer stacked on a dial side of the metal electrode, a transparent electrode stacked on a dial side of the semiconductor layer, and a protective layer stacked on a dial side of the transparent electrode,
wherein the metal electrode and the transparent electrode are excluded from the first non-power generating section, and the semiconductor layer and the protective layer are included within at least a portion of the first non-power generating section, and
wherein the solar battery further includes a non-conductive member between the semiconductor layer and the protective layer in the first non-power generating section.

19. The electronic timepiece according to claim 18,
wherein the protective layer comprises a plurality of stacked layers.

20. The electronic timepiece according to claim 18,
wherein an absorbance index of the non-conductive member is higher than an absorbance index of the protective layer.

* * * * *